(12) United States Patent
Maeda

(10) Patent No.: US 11,968,469 B2
(45) Date of Patent: Apr. 23, 2024

(54) COMPUTING APPARATUS, IMAGE CAPTURING APPARATUS, CONTROL METHOD, AND STORAGE MEDIUM

(71) Applicant: CANON KABUSHIKI KAISHA, Tokyo (JP)

(72) Inventor: Ryo Maeda, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/883,694

(22) Filed: Aug. 9, 2022

(65) Prior Publication Data
US 2023/0059207 A1 Feb. 23, 2023

(30) Foreign Application Priority Data

Aug. 20, 2021 (JP) ................................. 2021-135029

(51) Int. Cl.
*H04N 5/268* (2006.01)
*H04N 23/61* (2023.01)
*H04N 23/80* (2023.01)
(52) U.S. Cl.
CPC ............. *H04N 5/268* (2013.01); *H04N 23/61* (2023.01); *H04N 23/80* (2023.01)
(58) Field of Classification Search
CPC ............... H04N 5/268; H04N 5/23229; H04N 5/23218; G06F 3/0683; G06F 11/1666; G06F 3/0647
See application file for complete search history.

(56) References Cited

U.S. PATENT DOCUMENTS

2019/0138229 A1* 5/2019 Hong et al. ........... G06F 3/0619

FOREIGN PATENT DOCUMENTS

JP 2021-018593 A 2/2021

* cited by examiner

*Primary Examiner* — Xi Wang
(74) *Attorney, Agent, or Firm* — Carter, DeLuca & Farrell LLP

(57) ABSTRACT

An apparatus comprises a circuitry, a temporary memory and a permanent memory storing necessary information for executing each of a plurality types of processing. The apparatus receives a switching instruction and switches processing executed by the circuitry by varying the necessary information in response to reception of the instruction. The information is read out and loaded into a first region of the temporary memory. If the circuitry is executing at least one of the plurality types of processing when the instruction is made, the apparatus switches the circuitry to a state of being capable of executing the processing by reading out the information of the processing, loading the information into a second region of the temporary memory, and moving or copying the information related to the processing from the second region to the first region in response to the executing processing ending.

11 Claims, 20 Drawing Sheets

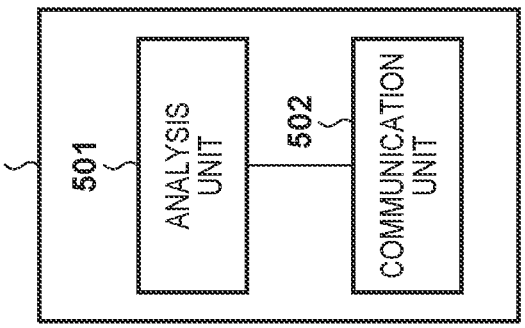
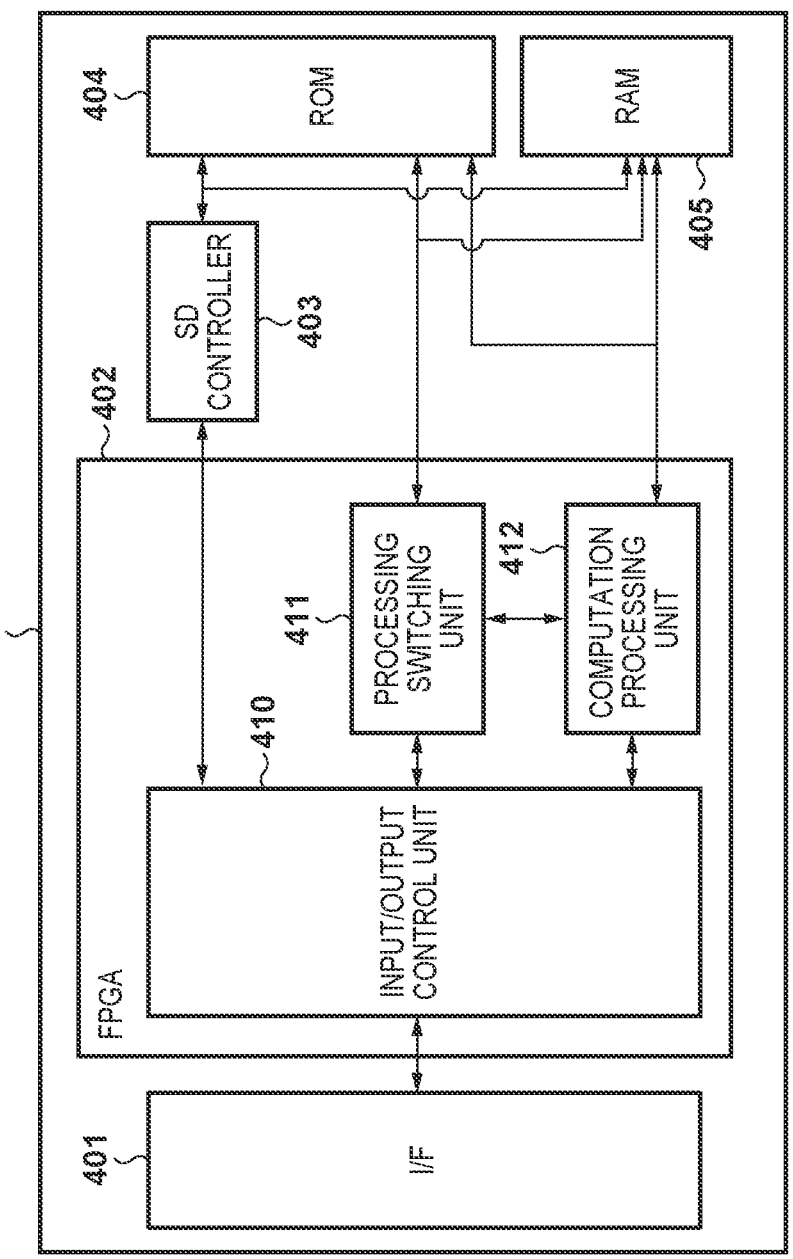

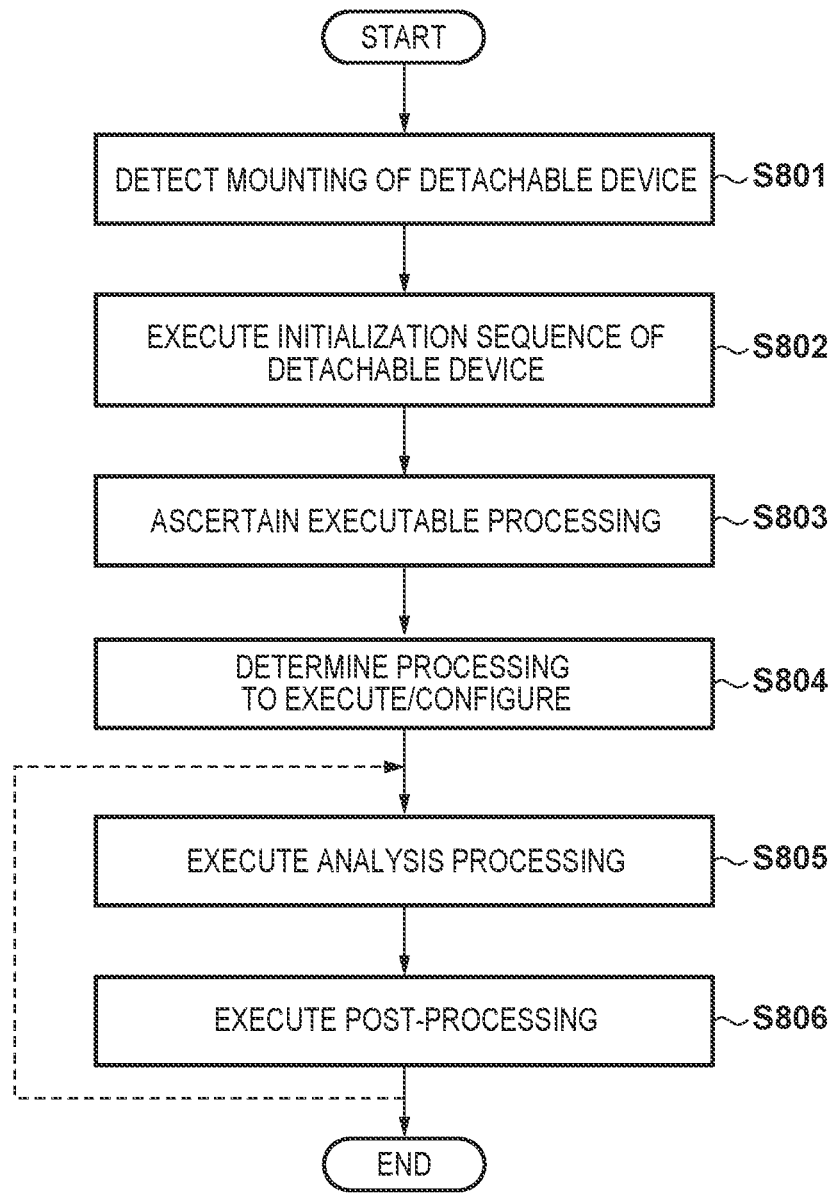

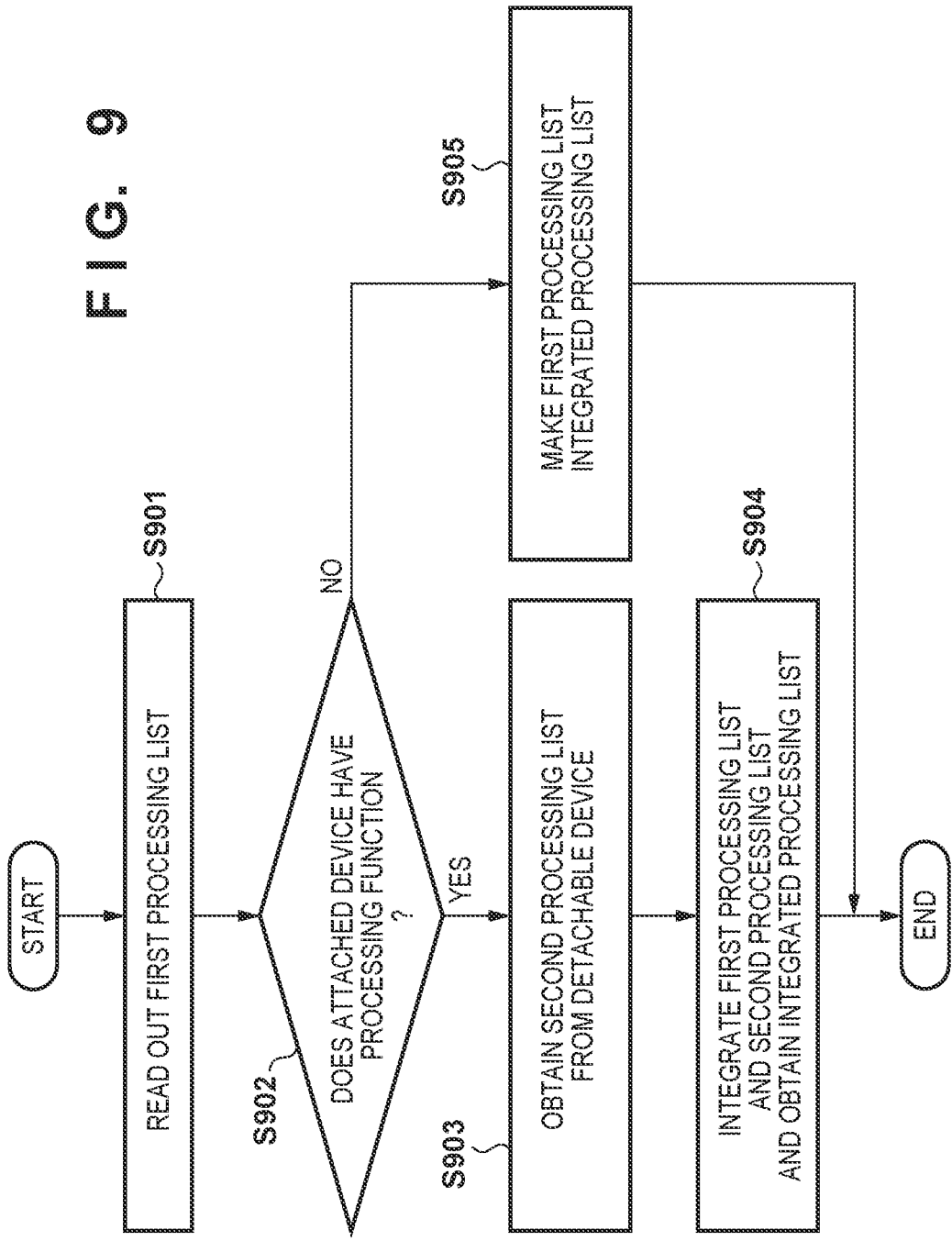

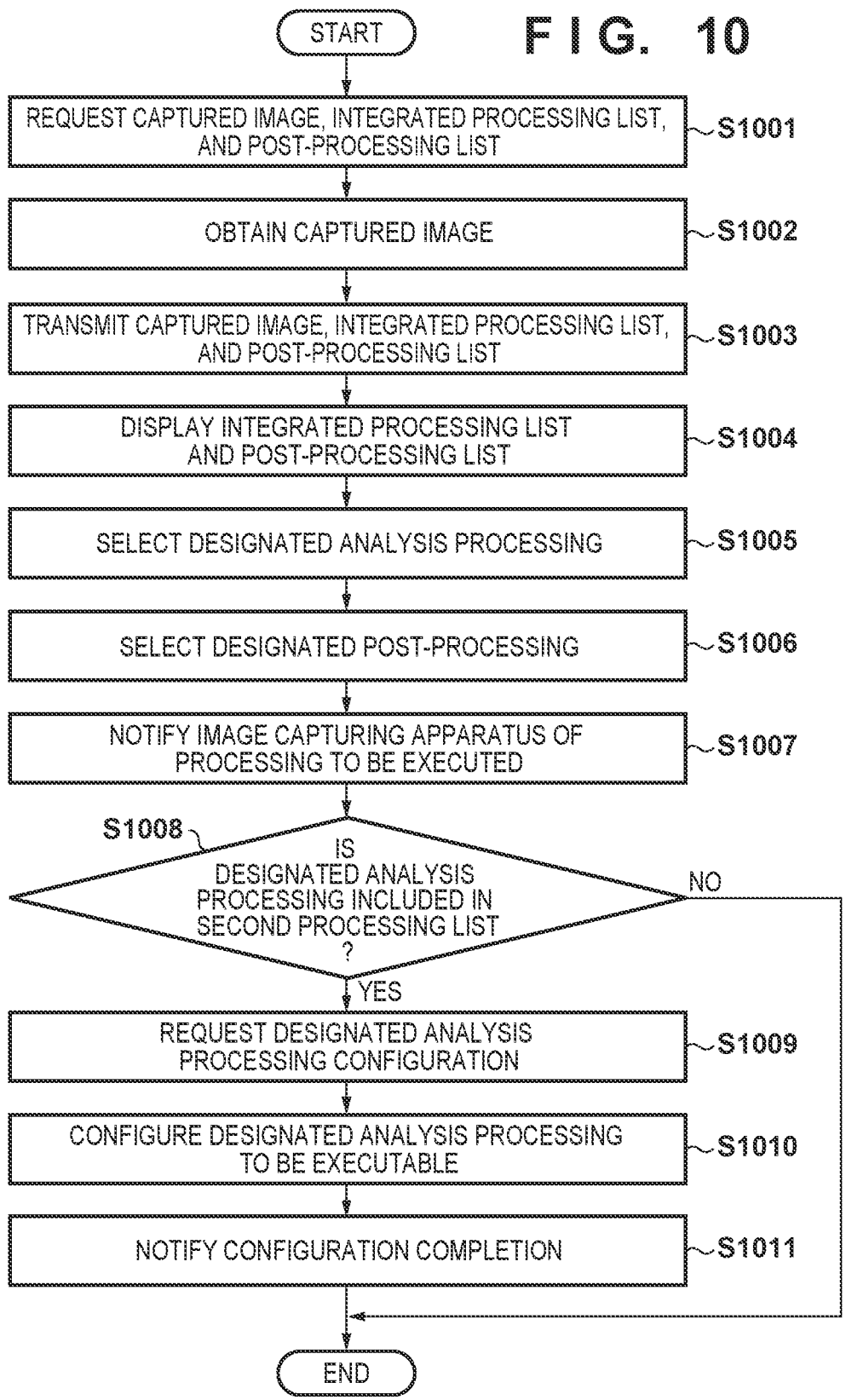

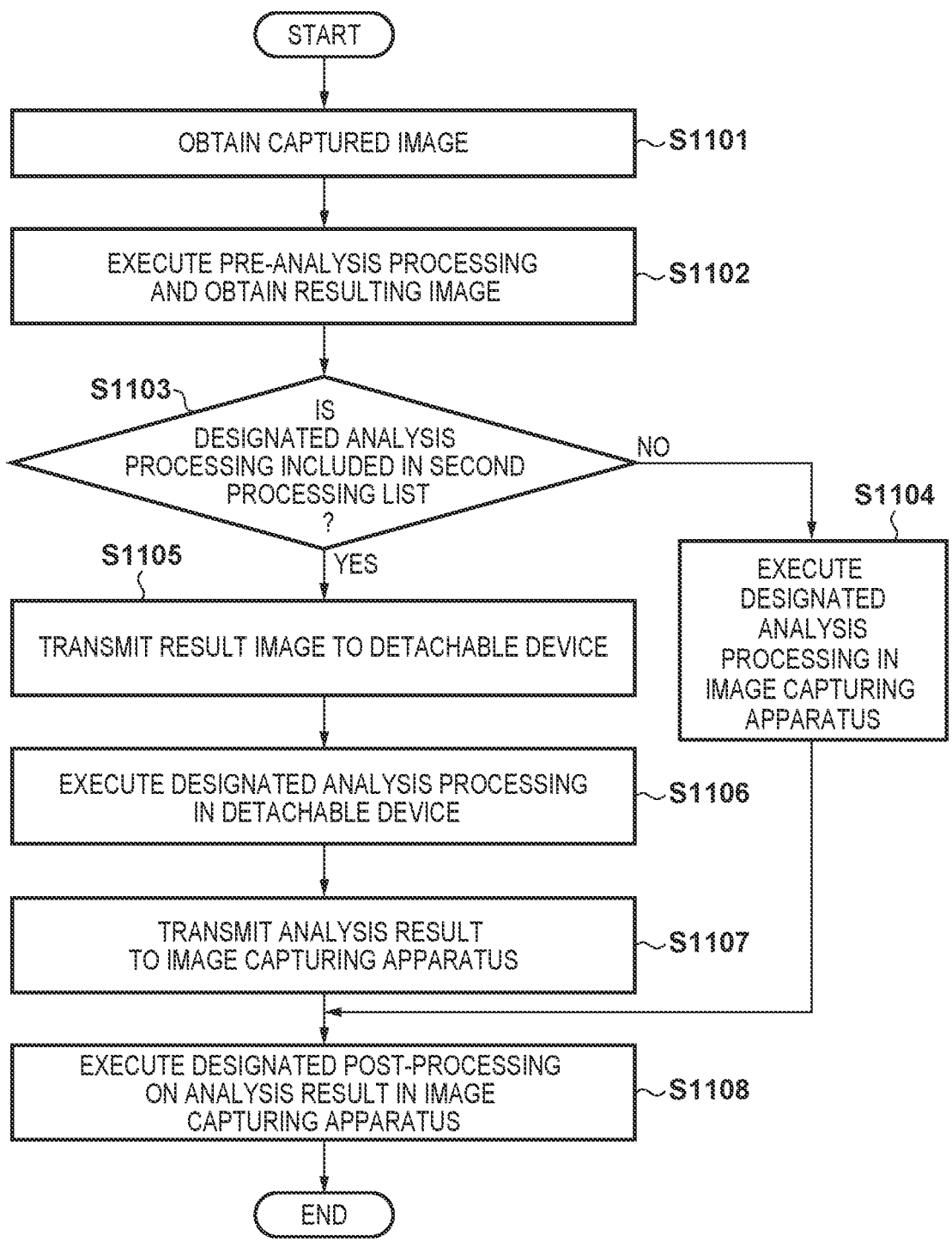

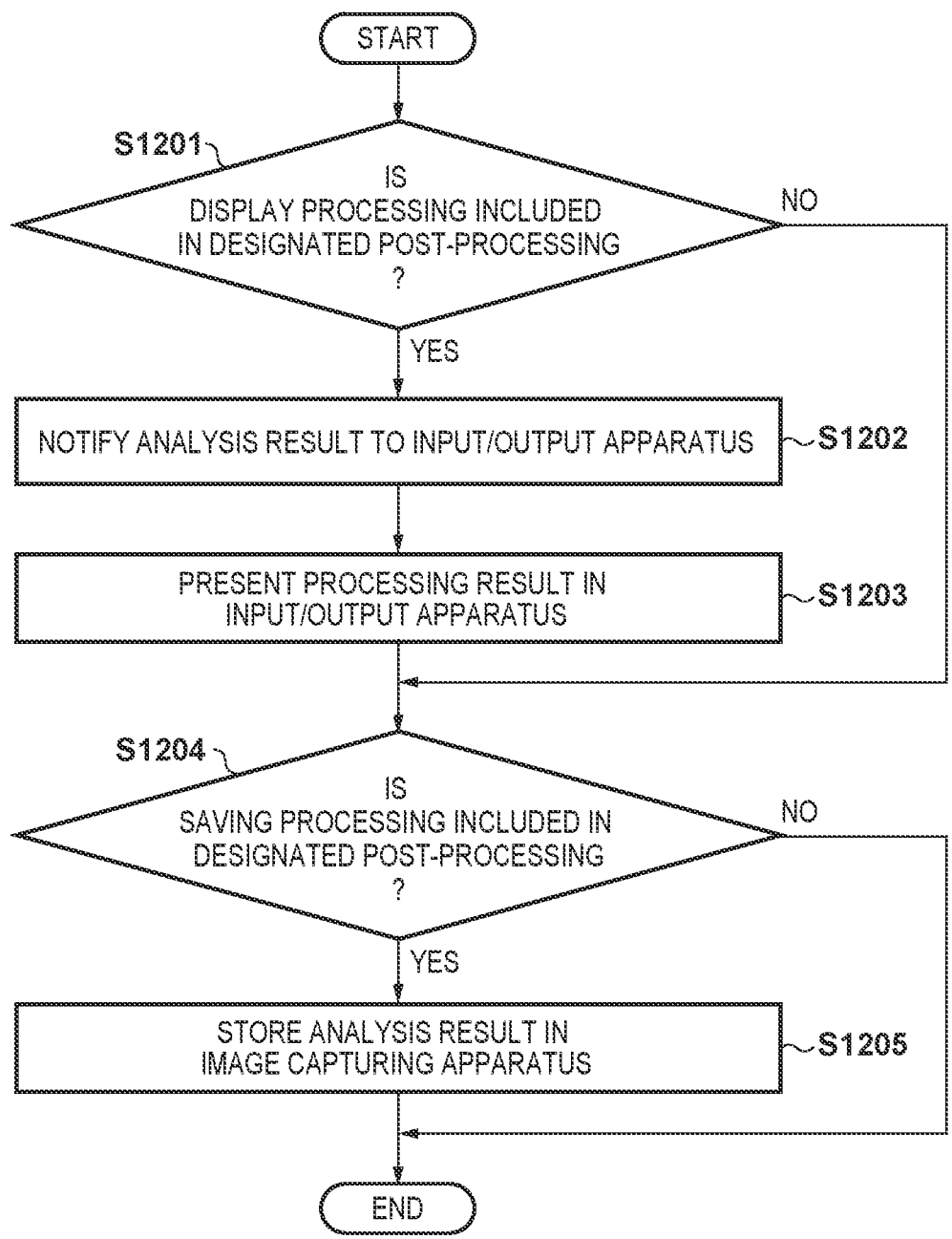

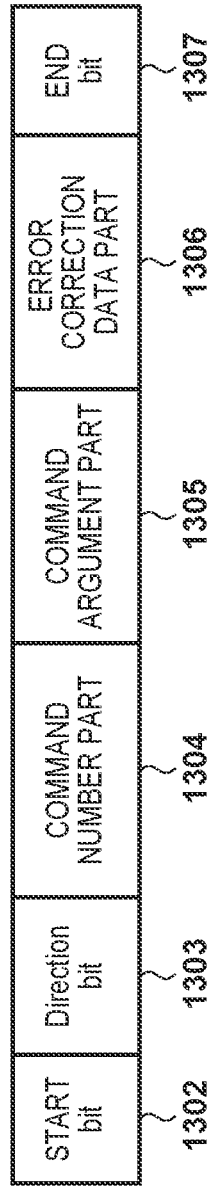
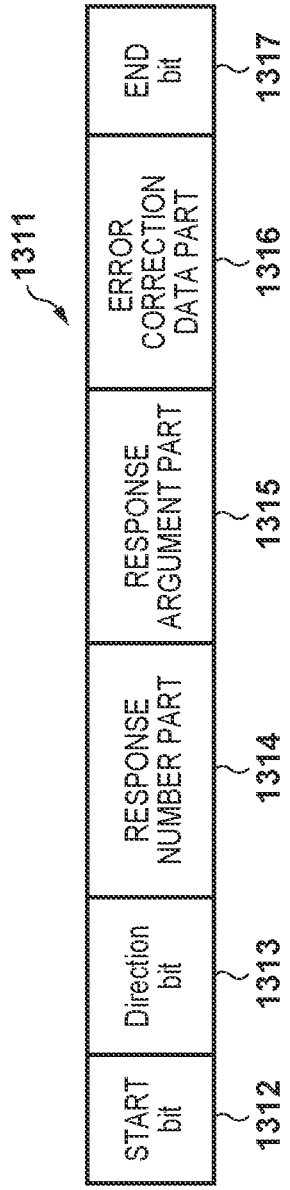
FIG. 13A
FIG. 13B

FIG. 14

1401 PROCESSING FUNCTION PRESENCE FLAG

| 0123 | 4567 | 89AB | CDEF | 0123 | 4567 | 89AB | CDEF |
|------|------|------|------|------|------|------|------|
| 0001 | 4040 | 0014 | 0640 | 0010 | FFFF | FFFF | 0000 |
| 0002 | 2020 | 001E | 2000 | 0020 | EEEE | EEEE | 0000 |
| 0003 | 1010 | 0028 | 0641 | 0030 | AAAA | AAAA | 0000 |
| 0004 | 0808 | 0050 | 0042 | 0040 | BBBB | BBBB | 0000 |
| ... | ... | ... | ... | ... | ... | ... | ... |
| PROCESSING FUNCTION CLASSIFI- CATION | INPUT DATA SIZE | PROCESSED DATA NUMBER | ESTIMATED PROCESSING TIME | PROCESSING RESULT DATA NUMBER | PROCESSING RESULT STORAGE DESTINATION ADDRESS | | |
| 1402 | 1403 | 1404 | 1405 | 1406 | 1407 | | |

FIG. 15

| 1402 | 1403 | 1404 | 1405 | 1406 | 1407 |
|---|---|---|---|---|---|
| PROCESSING FUNCTION CLASSIFICATION | INPUT DATA SIZE | PROCESSING DATA NUMBER | ESTIMATED PROCESSING TIME | PROCESSING RESULT DATA NUMBER | PROCESSING RESULT STORAGE DESTINATION ADDRESS |
| ANALYSIS PROCESSING A | 64×64 | 20 BLOCKS | 100ns | 16 BLOCKS | 0xFFFFFFFF |
| ANALYSIS PROCESSING B | 32×32 | 30 BLOCKS | 512ns | 32 BLOCKS | 0xEEEEEEEE |
| ANALYSIS PROCESSING C | 16×16 | 40 BLOCKS | 100μs | 48 BLOCKS | 0xAAAAAAAA |
| ANALYSIS PROCESSING D | 8×8 | 80 BLOCKS | 4ms | 64 BLOCKS | 0xBBBBBBBB |
| ... | ... | ... | ... | ... | ... |

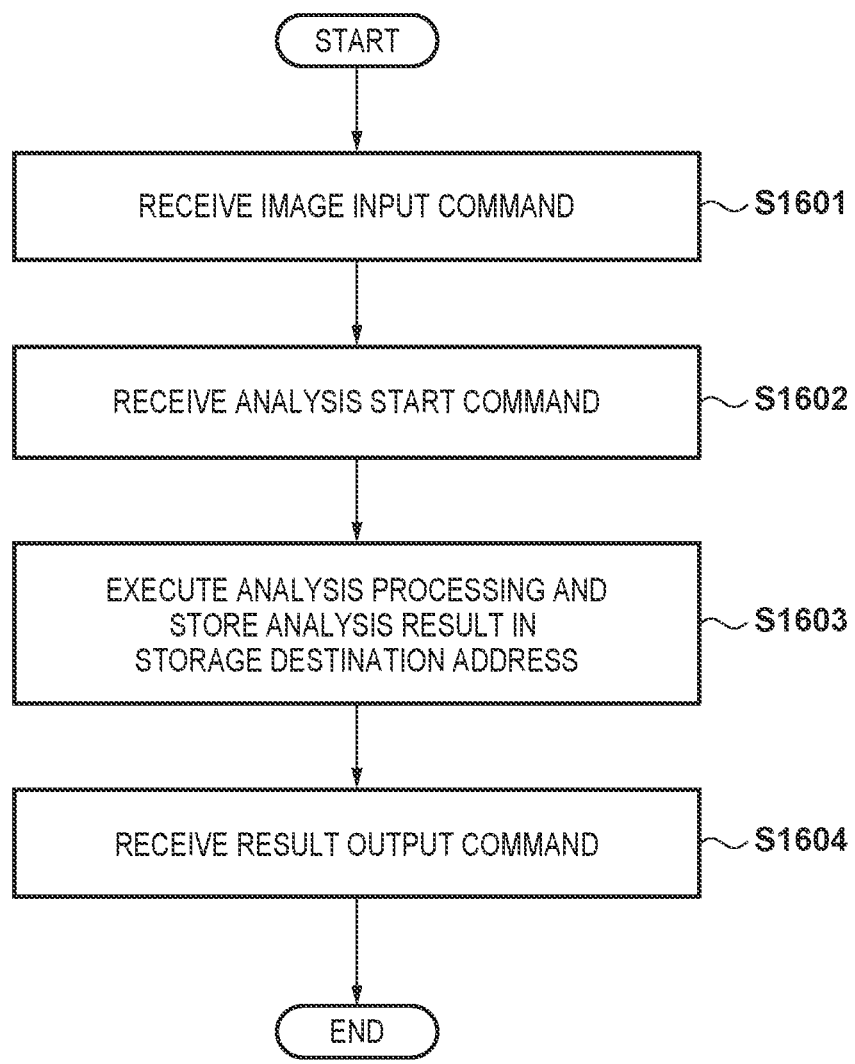

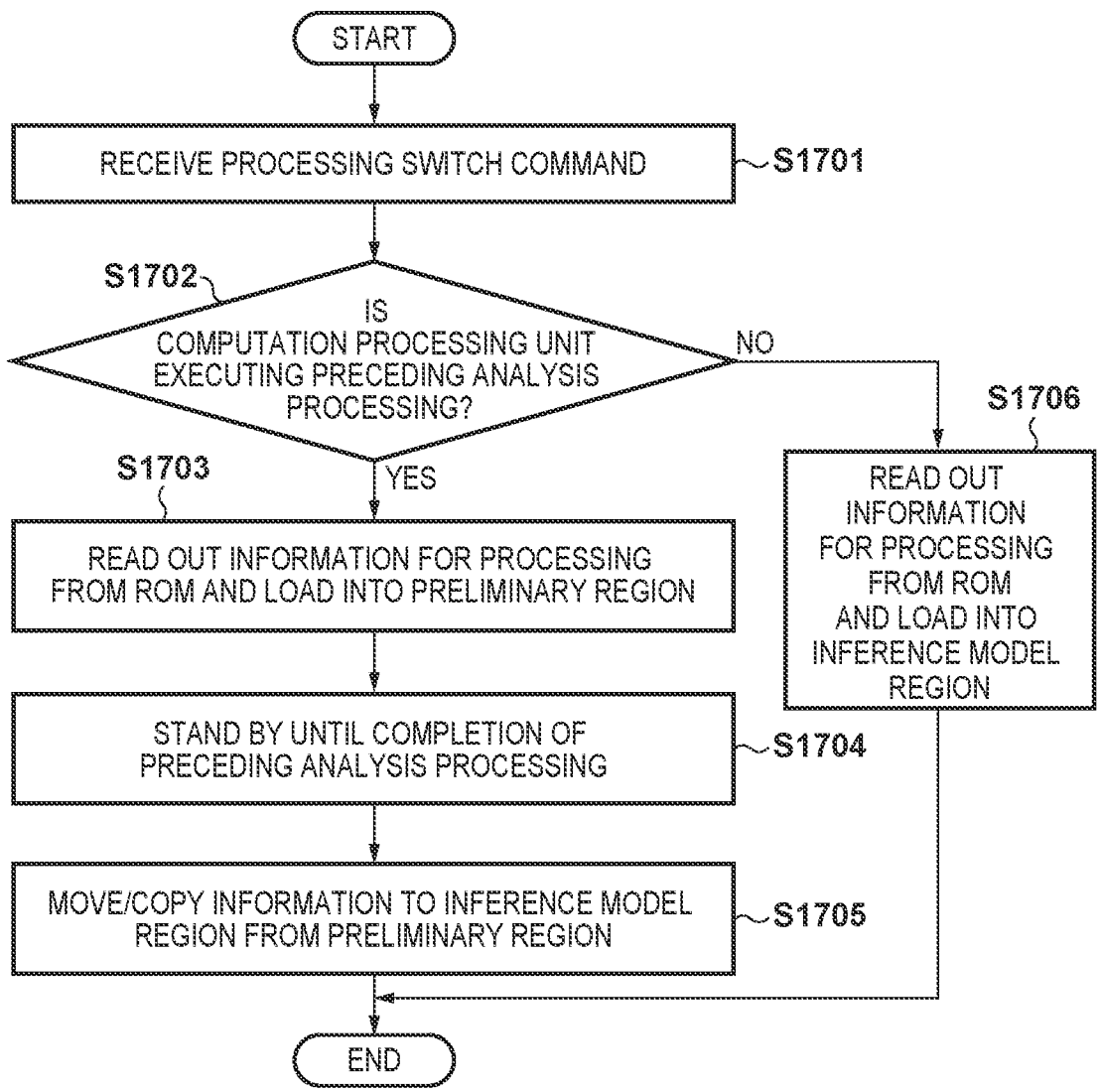

COMPUTING APPARATUS, IMAGE CAPTURING APPARATUS, CONTROL METHOD, AND STORAGE MEDIUM

BACKGROUND OF THE INVENTION

Field of the Invention

The present invention relates to computing apparatuses, image capturing apparatuses, control methods, and storage media, and particularly relates to image analysis techniques using reconfigurable computing apparatuses.

Description of the Related Art

Techniques exist which perform image analysis using inference results from inference models built based on machine learning. Japanese Patent Laid-Open No. 2021-018593 discloses a vehicle information processing apparatus equipped with a plurality of types of inference models based on objects, persons, behavior, and the like, that performs image processing by switching to an inference model suited to the vehicle environment.

For specific computation processing such as image analysis as described in Japanese Patent Laid-Open No. 2021-018593, even if the information processing apparatus itself is not equipped with hardware to perform the computation processing, it is possible to cause an external device detachably connected to the apparatus to efficiently execute the processing. Here, the external device may be equipped with a dedicated computation processing unit configured to execute specific computation processing, or may be equipped with a computation processing unit that can be reconfigured for different applications, such as an FPGA. In the latter case, when the computation processing unit is reconfigured to execute image analysis using the inference results from an inference model, image analysis for various types of detection targets can be handled by switching between a plurality of types of inference models to be used depending on, for example, the detection target. Thus, for example, by connecting an external device to an apparatus such as a surveillance camera, the image analysis capability of the apparatus can be improved or the functions thereof can be extended.

Incidentally, when a plurality of types of analysis processes having different inference models are sequentially applied to images using the computation processing unit of the external device, it is necessary for the data of the inference models used by the computation processing unit to be different for each analysis process. On the other hand, for example, if the reconfigurable computation processing unit is configured to implement analysis processing that uses one type of inference model at a time, it is not possible to change the inference model (rewrite the data of the inference model used) while one analysis process is being executed. Therefore, after the completion of the preceding analysis process, it is necessary to input an instruction to the external device to switch to the inference model for the subsequent analysis process, read out and rewrite the data of the inference model, and then execute the subsequent analysis process, which can prolong the overall processing time.

SUMMARY OF THE INVENTION

Having been conceived in light of the above-described problem, the present invention provides a computing apparatus, an image capturing apparatus, a control method, and a storage medium that reduce the time required to execute a plurality of types of processing.

The present invention in its first aspect provides a computing apparatus capable of executing a plurality of types of processing, the computing apparatus comprising: at least one processor and/or circuitry configured to execute at least one of the plurality of types of processing; a temporary memory; and a permanent memory configured to store necessary information for executing each of the plurality of types of processing and instructions that, when executed by the at least one processor and/or circuitry, cause the at least one processor and/or circuitry to function as: a receiving unit configured to receive a switching instruction for switching processing; and a switching unit configured to switch processing executed by the at least one processor and/or circuitry by varying the necessary information in response to reception of the switching instruction, the necessary information being read out from the permanent memory and loaded into a first region of the temporary memory, Wherein if the at least one processor and/or circuitry is executing at least one of the plurality of types of processing when the switching instruction is made, the switching unit switches the at least one processor and/or circuitry to a state of being capable of executing processing to be switched to by reading out, from the permanent memory, the necessary information related to the processing to be switched to, loading the necessary information into a second region of the temporary memory different from the first region, and moving or copying the necessary information related to the processing to be switched to from the second region to the first region in response to the processing being executed ending.

The present invention in its second aspect provides an image capturing apparatus to which the computing apparatus of the first aspect is detachably connected, the image capturing apparatus comprising: an image capturing unit configured to output a captured image; at least one processor and/or circuitry; and a memory storing instructions that, when executed by the at least one processor and/or circuitry, cause the at least one processor and/or circuitry to function as: a determination unit configured to determine a plurality of instances of analysis processing to be executed on the captured image by the computing apparatus and an order of the plurality of instances of analysis processing; a first input unit configured to input the captured image to the computing apparatus as an input image; a second input unit configured to sequentially input execution instructions for the plurality of instances of analysis processing and the switching instruction to the computing apparatus based on the order determined by the determination unit; and a second obtainment unit configured to obtain an analysis result of the plurality of instances of analysis processing by the computing apparatus.

The present invention in its third aspect provides a control method for a computing apparatus capable of executing a plurality of types of processing, wherein the computing apparatus comprises: a at least one processor and/or circuitry configured to execute at least one of the plurality of types of processing; a temporary memory; and a permanent memory configured to store necessary information for executing each of the plurality of types of processing, and the control method comprises: receiving a switching instruction for switching processing; and switching processing executed by the at least one processor and/or circuitry by varying the necessary information in response to reception of the switching instruction, the necessary information being read out from the permanent memory and loaded into a first region of the temporary memory, and in the switching, if the at least one processor and/or circuitry is executing at least one of the plurality of types of processing when the switching instruction is made, the at least one processor and/or circuitry is switched to a state of being capable of executing processing to be switched to by reading out, from the permanent memory, the necessary information related to the processing to be switched to, loading the necessary information into a second region of the temporary memory different from the first region, and moving or copying the necessary information related to the processing to be switched to from the second region to the first region in response to the processing being executed ending.

The present invention in its fourth aspect provides a non-transitory computer-readable storage medium in which is stored a program that causes a computer to execute the control method of the third aspect.

Further features of the present invention will become apparent from the following description of exemplary embodiments (with reference to the attached drawings).

BRIEF DESCRIPTION OF THE DRAWINGS

FIG. 4 is a block diagram illustrating an example of the hardware configuration of a detachable device according to the embodiments and variation of the present invention.

FIG. 5 is a block diagram illustrating an example of the functional configuration of the detachable device according to the embodiments and variation of the present invention.

FIG. 8 is a flowchart illustrating the flow of a sequence of analysis processing executed in the image analysis system according to the embodiments and variation of the present invention.

FIG. 9 is a flowchart illustrating the flow of processing for ascertaining processing that can be executed locally in an image capturing apparatus 110 according to the embodiments and variation of the present invention.

FIG. 10 is a flowchart illustrating the flow of processing for determining the details of analysis processing performed by the image capturing apparatus and the detachable device according to the embodiments and variation of the present invention.

FIG. 11 is a flowchart illustrating the flow of control when executing designated analysis processing locally in the image capturing apparatus according to the embodiments and variation of the present invention.

FIG. 12 is a flowchart illustrating the flow of control when executing designated post-processing according to the embodiments and variation of the present invention.

FIGS. 13A and 13B are diagrams illustrating the structure of commands and responses according to the embodiments and variation of the present invention.

FIG. 14 is a diagram schematically illustrating data in an address storing information on processing functions according to the embodiments and variation of the present invention.

FIG. 15 is a diagram illustrating an example of a processing function table constructed in the image capturing apparatus according to the embodiments and variation of the present invention.

FIG. 16 is a flowchart illustrating an example of the flow of analysis processing executed in the detachable device according to the embodiments and variation of the present invention.

FIG. 17 is a flowchart illustrating an example of the flow of control when a processing switch command is received in the detachable device according to the embodiments and variation of the present invention.

DESCRIPTION OF THE EMBODIMENTS

First Embodiment

Figure 1:
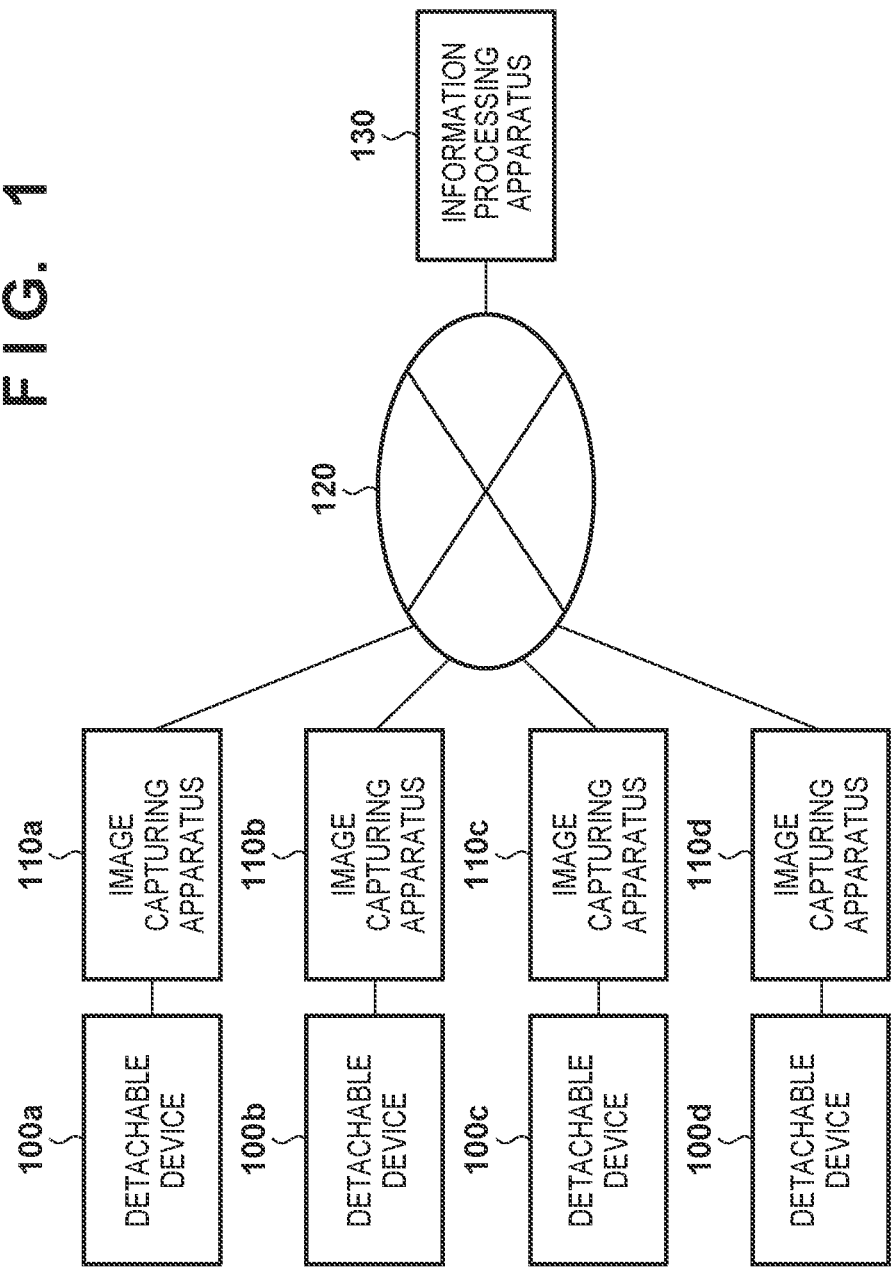
FIG. 1 is a diagram illustrating an example of the configuration of an image analysis system according to embodiments and a variation of the present invention.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

One embodiment, described below; will describe applying the present invention in a detachable device (a reconfigurable computing apparatus) that is equipped with a reconfigurable FPGA and that can execute different image analysis processing by utilizing different inference models, as an example of a computing apparatus. However, the present invention is applicable to any device that can switch between the execution of a plurality of types of processing as the information used is changed.

System Configuration

FIG. 1 illustrates an example of the system configuration of an image analysis system according to an embodiment of the present invention. The image analysis system according to the present embodiment will be described as a surveillance system capable of detecting and tracking specific persons, objects, and the like by executing image analysis processing on captured images obtained by image capturing apparatuses 110 connected over a network 120. However, it is easily understood that the implementation of the present invention is not limited thereto, and the present invention can be applied to any system configured using any device to which a detachable device 100 can be attached.

Each of the image capturing apparatuses 110 is configured, for example, having a slot into and from which a device capable of storing captured images can be inserted and removed, and the detachable device 100 can be inserted into the stated slot. In other words, the detachable device 100 is a device that can also operate as a device capable of recording, and can be attached by being inserted into the slot in the image capturing apparatus 110 to provide image processing functions involving image analysis to the image capturing apparatus 110. In the example in FIG. 1, the image analysis system includes four image capturing apparatuses 110a to 100d, to which are attached detachable devices 100a to 100d. However, the numbers of image capturing apparatuses 110 and detachable devices 100 included in the image analysis system are not limited thereto, and may be any numbers. In the following descriptions, to facilitate understanding of the invention, each of the image capturing apparatuses 110 and the detachable devices 100 are assumed to have the same configuration, and will be referred to simply as "image capturing apparatus 110" or "detachable device 100" (without appending "a" to "d") unless otherwise necessary.

The detachable device 100 is a computing device that can be attached to and detached from the image capturing apparatus 110. The detachable device 100 in the present embodiment is a device that can operate as a recording apparatus according to the SD standard (an SD card), and is equipped with reconfigurable processing circuitry. The detachable device 100 can be configured to be inserted in its entirety into the image capturing apparatus 110, for example, in the form of an SD card, and can therefore be attached to the image capturing apparatus 110 with no part protruding from the image capturing apparatus 110. The detachable device 100 may, for example, be configured so that more than half thereof can be inserted into the image capturing apparatus 110, and can therefore be attached to the image capturing apparatus 110 with a small part protruding from the image capturing apparatus 110. This makes it possible to prevent the detachable device 100 from interfering with obstructions such as wiring, which makes it possible to improve convenience when using the device. In addition, since many existing image capturing apparatuses 110 such as network cameras are provided with SD card slots, extended functionality which can be realized by the reconfigurable processing circuitry of the detachable device 100 can be provided for such existing image capturing apparatuses 110. Note that the detachable device 100 may be attached through any connection interface provided for any recording apparatus that is attached to the image capturing apparatus 110 for the purpose of recording captured images, even aside from the form of an SD card. For example, the detachable device 100 may have a Universal Serial Bus (USB) interface and be configured to attach to a USB socket in the image capturing apparatus 110. The reconfigurable processing circuitry is implemented, for example, by a field programmable gate array (FPGA) programmed to execute predetermined processing, but may be implemented in other formats.

The image capturing apparatus 110 is an image capturing apparatus such as a network camera. In the present embodiment, the image capturing apparatus 110 is assumed to include a computing apparatus capable of processing video images, but is not limited thereto. For example, there may be an external computer such as a personal computer (PC) connected to the image capturing apparatus 110, and a combination of these may be handled as the image capturing apparatus 110. Additionally, the present embodiment assumes that all the image capturing apparatuses 110 are equipped with a detachable device 100. Even if the image capturing apparatus 110 does not have an image analysis processing function, attaching a detachable device TOO having an image analysis processing function makes it possible to execute the image processing using the detachable device 100. In a situation where the image capturing apparatus 110 has an image analysis processing function (is equipped with a computing apparatus for processing), as in the present embodiment, at least some image processing that can be executed in the image capturing apparatus 110 can be made more advanced and efficient by attaching the detachable device 100.

An input/output apparatus 130 is an apparatus that accepts inputs from the user and outputs information to the user (e.g., displays information) in the image analysis system. In the present embodiment, for example, the input/output apparatus 130 is a computer, such as a PC, and information is input and output via a browsing application (browser), a native application, or another application installed in the computer.

The image capturing apparatus 110 and the input/output apparatus 130 are communicably connected over the network 120. The network 120 is constituted by a plurality of routers, switches, cables, and the like that meet a communication standard such as Ethernet (registered trademark), for example. In the present embodiment, the network 120 may be any network that enables communication between the image capturing apparatus 110 and the input/output apparatus 130, and may be constructed at any scale, with any configuration, and compliant with any communication standard. For example, the network 120 can be the Internet, a wired Local Area Network (LAN), a wireless LAN, or a Wide Area Network (WAN). The network 120 can be configured, for example, to enable communication using a communication protocol compliant with the Open Network Video Interface Forum (ONVIF) standard. However, the configuration is not limited thereto, and the network 120 may be configured to enable communication with other communication protocols, such as proprietary communication protocols, for example.

Apparatus Configuration

Hardware Configuration of Image Capturing Apparatus

Figure 2:
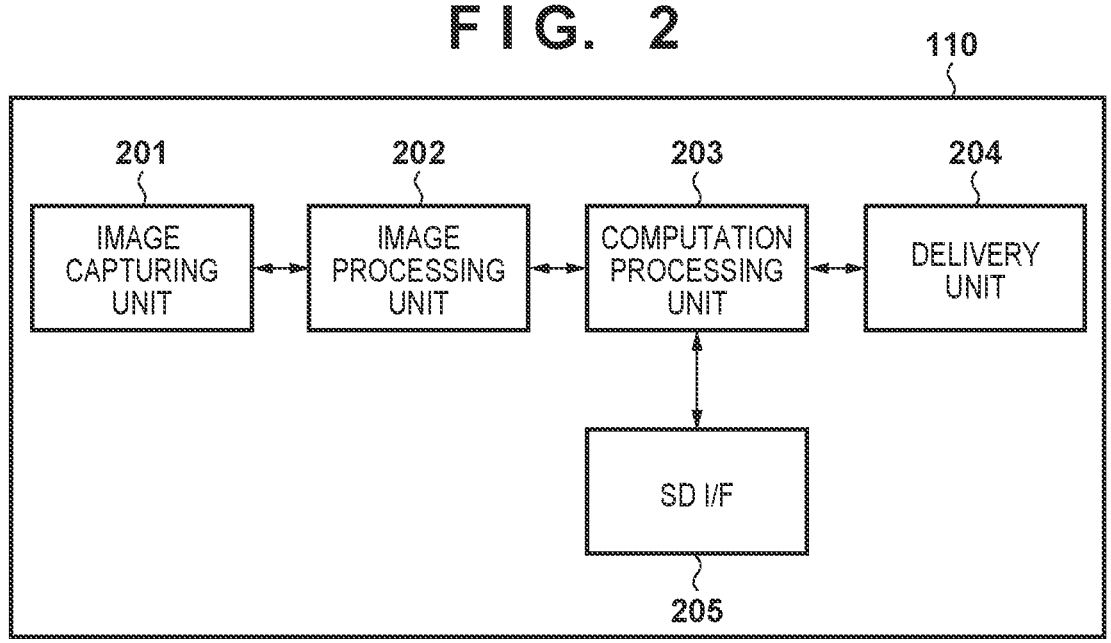
FIG. 2 is a block diagram illustrating an example of the hardware configuration of an image capturing apparatus according to the embodiments and variation of the present invention.

The hardware configuration of the image capturing apparatus 110 will be described hereinafter. FIG. 2 is a diagram illustrating an example of the hardware configuration of the image capturing apparatus 110, The image capturing apparatus 110 includes, as its hardware configuration, an image capturing unit 201, an image processing unit 202, a computation processing unit 203, a delivery unit 204, and an SD IX 205, for example. Note that "I/F" is an abbreviation for "interface".

The image capturing unit 201 is constituted by a lens unit for forming an image of light and an image sensor that converts analog signals based on the formed light. The lens unit has a zoom function for adjusting the angle of view an aperture function for adjusting the amount of light, and the like. The image sensor has a gain function for adjusting the sensitivity when converting light into an analog signal. These functions are adjusted based on setting values communicated from the image processing unit 202. An analog signal obtained by the image capturing unit 201 is converted to a digital signal by an analog-digital conversion circuit, and is transferred as an image signal to the image processing unit 202.

The image processing unit 202 is constituted by an image processing engine, peripheral devices thereof, and the like. The peripheral devices include, for example, Random Access Memory (RAM), drivers for each of I/Fs, and the like. In the image processing unit 202, image data is generated by applying image processing, such as, for example, development processing, filter processing, sensor correction, noise removal, and the like to the image signal obtained from the image capturing unit 201. The image processing unit 202 can also transmit setting values to the lens unit, the image sensor, and the like, and execute exposure adjustment so that an appropriately exposed image can be obtained. The image data generated in the image processing unit 202 is transferred to the computation processing unit 203.

The computation processing unit 203 is constituted by at least one processor, such as a CPU, an MPU, and the like, memory such as RAM and ROM, and drivers for each of the I/Fs. Note that CPU is an acronym of "Central Processing Unit", MPU is an acronym of "Micro Processing Unit", RAM is an acronym of "Random Access Memory", and ROM is an acronym of "Read-Only Memory". In the computation processing unit 203, in one example, it is possible to determine the allotment of processing, i.e., which part of the processing executed in the system described above is to be executed by the image capturing apparatus 110 or the detachable device 100, and to perform the processing corresponding to the determined allotment. The details of the processing, the allotment of the processing, and the like will be described later. An image received from the image processing unit 202 is transferred to the delivery unit 204 or the SD I/F 205. Data from processing results is also transferred to the delivery unit 204.

The delivery unit 204 is configured including a network delivery engine, peripheral devices such as RAM and an ETH PRY module, and the like, for example. The ETH PHY module is a module that executes the physical (PRY) layer processing of Ethernet. The delivery unit 204 converts image data, processing result data, and the like obtained from the computation processing unit 203 into a format that can be delivered to the network 120, and outputs the converted data to the network 120. The SD I/F 205 is an interface part for connecting to the detachable device 100, and is configured including, for example, a power supply and a mounting mechanism, such as an attachment socket or the like, for attaching and detaching the detachable device 100. Here, it is assumed that the SD I/F 205 is configured according to the SD standard established by the SD Association. Communication between the detachable device 100 and the image capturing apparatus 110, such as transferring images obtained from the computation processing unit 203 to the detachable device 100, obtaining data from the detachable device 100, and the like, is performed through the SD I/F 205.

Functional Configuration of Image Capturing Apparatus

Figure 3:
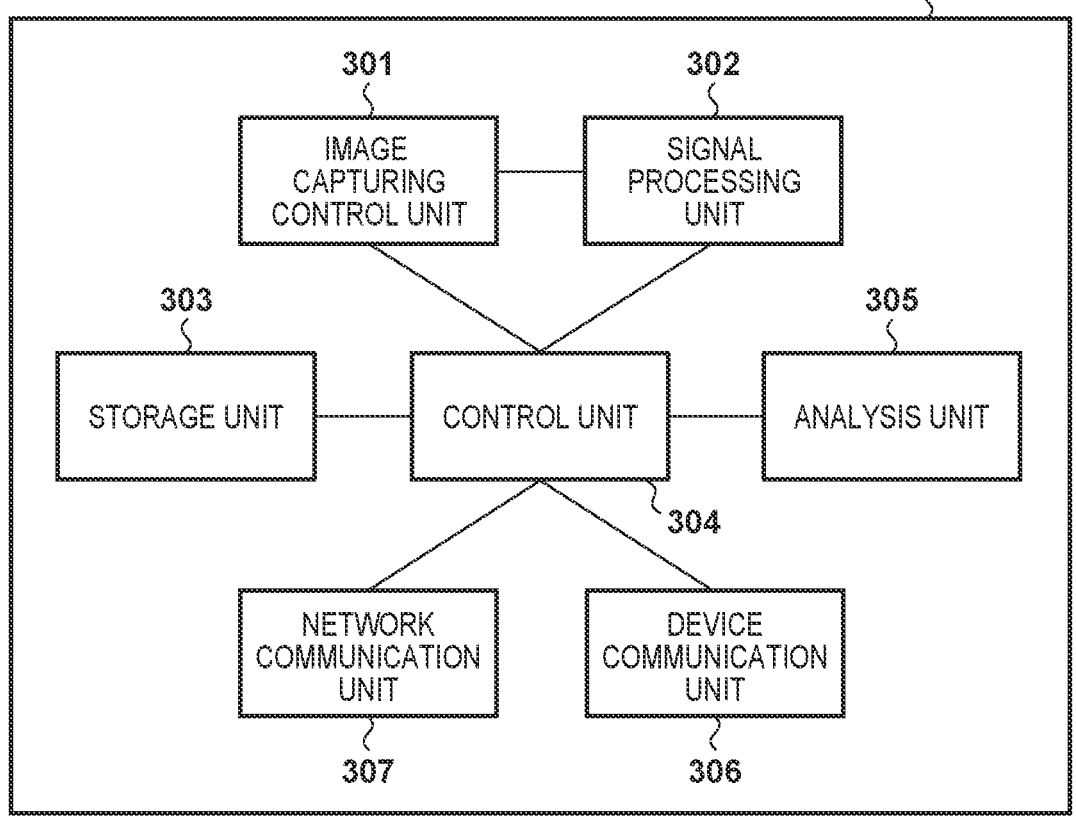
FIG. 3 is a block diagram illustrating an example of the functional configuration of the image capturing apparatus according to the embodiments and variation of the present invention.

FIG. 3 illustrates an example of the functional configuration of the image capturing apparatus 110. The image capturing apparatus 110 includes, as its function, an image capturing control unit 301, a signal processing unit 302, a storage unit 303, a control unit 304, an analysis unit 305, a device communication unit 306, and a network communication unit 307, for example.

The image capturing control unit 301 executes control that causes the surrounding environment to be captured through the image capturing unit 201. The signal processing unit 302 performs predetermined processing on the image captured by the image capturing control unit 301, and generates data of the captured image. Hereafter, this captured image data will be simply referred to as a "captured image". The signal processing unit 302 encodes the image captured by the image capturing control unit 301, for example. The signal processing unit 302 encodes still images using, for example, an encoding method such as Joint Photographic Experts Group (MEG) or the like. The signal processing unit 302 encodes moving images using an encoding method such as 11264/MPEG-4 AVC (referred to as "H.264" hereinafter), High Efficiency Video Coding (HEVC), or the like. The signal processing unit 302 may encode images using an encoding method selected by the user from among a plurality of predetermined encoding methods through an operation input unit (not shown) of the image capturing apparatus 110, for example.

The storage unit 303 stores a list (referred to as a "first processing list" hereinafter) of image analysis processing that can be executed in the analysis unit 305 (simply referred to as "analysis processing" hereinafter), and a list of post-processing for the result of the analysis processing (a "post-processing list"). In the present specification, simply using the term "post-processing" indicates processing that handles the results of the analysis processing and the captured image, such as display and storage, after the analysis processing has been executed on the captured image, and is different from "post-analysis processing" included in the series of operations by the analysis unit 305 (described later) The storage unit 303 also stores results of the analysis processing (described later). Although the present embodiment describes the processing executed on the captured images as being analysis processing, but the processing executed on the captured images may be any processing. In this case, the content of the first processing list and the post-processing list stored in the storage unit 303 change.

The control unit 304 controls the operations of the signal processing unit 302, the storage unit 303, the analysis unit 305, the device communication unit 306, and the network communication unit 307, respectively. In more detail, the control unit 304 controls the operations of each functional configuration by having the computation processing unit 203 load a control program for each functional configuration stored in the ROM into the RAM and execute the program.

The analysis unit 305 selectively executes at least one of pre-analysis processing, analysis processing, and post-analysis processing (described later) on the captured image. The pre-analysis processing is processing executed on the captured image before the analysis processing (described later) is executed. The present embodiment will describe the execution of processing of dividing the captured image into a divided image as an example of the pre-analysis processing. The analysis processing outputs information obtained by analyzing the input image. The present embodiment will describe processing in which at least one type of analysis processing among human body detection processing, face detection processing, and vehicle detection processing is executed using the divided image obtained from the pre-analysis processing as input, and an analysis result is output, as an example of the analysis processing. The analysis processing may be processing that outputs the location of an object in the divided image using a machine learning model (an inference model or a deep learning (DL) model) that has been built to detect objects in the image through advance training using supervisory data, for example. The post-analysis processing is processing, executed after the analysis processing is executed, to configure the analysis result output from the analysis unit 305. The present embodiment will describe the execution of processing that outputs a value of the total number of objects detected in each divided image as the analysis result based on the result of the analysis processing for each divided image as an example of the post-analysis processing. Note that the analysis processing may be processing that detects an object in the image through pattern matching and outputs the location thereof, or may be processing that performs detection without using an inference result from the inference model.

The device communication unit 306 communicates with the detachable device 100. The device communication unit 306 converts input data into a format that can be processed by the detachable device 100 and transmits the data obtained from the conversion to the detachable device 100. The device communication unit 306 also receives data from the detachable device 100 and converts the received data into a format that can be processed by the image capturing apparatus 110. The conversion processing executed by the device communication unit 306 may include, for example, processing of converting decimals between floating-point format and fixed-point format. The conversion processing is not limited thereto, however, and the device communication unit 306 may also execute other processing. Additionally, in the present embodiment, the device communication unit 306 communicates with the detachable device 100 by transmitting a predefined command sequence to the detachable device 100 in accordance with the SD standard and receiving a response from the detachable device 100.

The network communication unit 307 communicates with the input/output apparatus 130 over the network 120, The network communication unit 307 configures information in a predetermined format between the image capturing apparatus 110 and the input/output apparatus 130, and transmits the information to the input/output apparatus 130. Alternatively, in response to the reception of predetermined information from the input/output apparatus 130, the network communication unit 307 notifies the control unit 304 of the reception of the information.

Hardware Configuration of Detachable Device

FIG. 4 illustrates an example of the hardware configuration of the detachable device 100. The detachable device 100 is configured including, for example, an I/F 401, an FPGA 402, an SD controller 403. ROM 404, and RAM 405. The detachable device 100 is assumed to be molded in a shape that enables insertion into and removal from the attachment socket of the SD I/F 205 of the image capturing apparatus 110, i.e., in a shape conforming to the SD standard and configured including contact terminals conforming to the SD standard.

The IX 401 is an interface fix connecting the detachable device 100 to an apparatus such as the image capturing apparatus 110. The I/F 401 is configured including, for example, electrical contact terminals and the like that receive a power supply from the image capturing apparatus 110, and generate and distribute power for use within the detachable device 100. The i/F 401 is assumed to be designed and configured according to the structure defined in (conforming to) the SD standard, in the same manner as the SD IX 205 of the image capturing apparatus 110. The reception of images, instructions and configuration data (described later), and the like input from the image capturing apparatus 110, and the transmission of data from the FPGA 402 to the image capturing apparatus 110, are executed through the I/F 401.

The FPGA 402 is a reconfigurable computation circuit, and will be described in the present embodiment as a semiconductor device whose internal logic circuit structure can be repeatedly configured (is reconfigurable). The FPGA 402 is configured including an input/output control unit 410, a processing switching unit 411, and a computation processing unit 412. The FPGA 402 is capable of executing predetermined computation processing by being reconfigured, and can add (provide) corresponding relevant computation processing functions to the apparatus to which the detachable device 100 is attached. In other words, the logic circuit structure of the FPGA 402 can be changed, and thus appropriate functions and processing capabilities can be added in a timely manner by attaching the detachable device 100 to the apparatus, even in fields where technology is advancing rapidly, for example. Although the present embodiment describes an example in which an FPGA is used as the reconfigurable computation circuit, a general-purpose ASIC, a dedicated LSI circuit, or the like may be used, for example, as long as the processing described below can be implemented.

The FPGA 402 is reconfigured based on configuration data that includes information on the logic circuit structure to be reconfigured. The present embodiment will describe the configuration data as being obtained by being read out from the ROM 404 through a dedicated IN provided in the FPGA 402. For example, the FPGA 402 may be started by reading out the necessary configuration data from the ROM 404 into the RAM 405 and reconfiguring the logic circuit structure based on the read-out configuration data when the power supply is initiated, such as when connected to the image capturing apparatus 110. However, the obtainment of the configuration data is not limited to being read out from the ROM 404, and the configuration data may be received (written into the RAM 405) from the image capturing apparatus 110 through the I/F 401 and a dedicated I/F, for example. In this case, the received configuration data may be additionally stored in the ROM 404 so as to be usable again.

In the present embodiment, to enable the execution of predetermined analysis processing, the FPGA 402 is reconfigured based on the configuration data pertaining to that analysis processing. The analysis processing executed on images by the FPGA 402 uses inference results from inference models to derive the analysis results, and can detect different types of targets according to the inference model used. In the detachable device 100 according to the present embodiment, the FPGA 402 performs inference using the data of an inference model loaded in the RAM 405 (described later) during the execution of the analysis processing. Therefore, the FPGA 402 is configured to enable different analysis processing to be executed even when the data of the inference model loaded in the RAM 405 is changed. In other words, after the logic circuit structure is reconfigured to enable the execution of predetermined analysis processing, the FPGA 402 can execute a plurality of types of analysis processing with different inference models used, while keeping the same structure.

To facilitate understanding the invention, the present embodiment will refer to changing the data of the inference model loaded in the RAM 405 as "changing the processing executed by the FPGA 402". In other words, the present embodiment will describe the contents and results of inference by the inference model being changed when an instruction to switch the inference model is provided from the image capturing apparatus 110 to the detachable device 100, and the processing executed by the FPGA 402 changing as a result. However, the implementation of the present invention is not limited thereto, and changes to the processing executed by the FPGA 402 may include changes to the logic circuit structure of the FPGA 402 itself, in addition to changes to the data on the RAM 405 referenced in the processing.

The input/output control unit 410 of the FPGA 402 is constituted by circuitry for transmitting and receiving images to and from the image capturing apparatus 110, circuitry for analyzing commands (instructions) received from the image capturing apparatus 110, circuitry for performing control based on analyzed results, and the like. Here, the commands are commands defined in the SD standard, and the input/output control unit 410 can detect some of the commands. The detachable device 100 of the present embodiment can be used for recording captured images in addition to analyzing captured images, and for example, the input/output control unit 410 can switch between analysis processing and recording processing for such captured images according to instructions received in connection with the captured images. The input/output control unit 410 performs control for causing captured images to be transmitted to and stored in the RAM 405 when performing analysis processing, and causing the captured images to be transmitted to the SD controller 403 and recorded in the ROM 404 when performing recording processing. In addition, upon receiving an instruction to switch the analysis processing, the input/output control unit 410 outputs information on the switching instruction to the processing switching unit 411. Alternatively, upon receiving a configuration request pertaining to the reconfiguration of the FPGA 402, the input/output control unit 410 reads out the corresponding configuration data from the ROM 404 through a dedicated I/F and outputs the configuration data to the processing switching unit 411.

The processing switching unit 411 executes processing related to the switching of the processing executed by the FPGA 402, and more specifically, the processing executed by the computation processing unit 412 (described later). The processing switching unit 411 is configured including circuitry for reading out information on the corresponding analysis processing function (referred to as "information for processing" hereinafter) from the ROM 404 and writing (loading) that information into the RAM 405 based on the information in the switching instruction, Here, "information for processing" refers to parameters that indicate the order and type of computations, coefficients of the computations, and the like for the analysis processing executed in the computation processing unit 412, and is information that can be used as data for the inference model upon being loaded. The processing switching unit 411 is also configured including circuitry that writes information for reconfiguring the logic circuit structure of the computation processing unit 412 based on the input configuration data. In the following, to facilitate understanding of the invention, the switching of the processing by the processing switching unit 411 will be described as being implemented mainly by changing the information for processing that is loaded, but the present invention does not exclude that the computation processing unit 412 can be reconfigured when switching the processing, as described above.

The computation processing unit 412 corresponds to the logic circuit structure of the FPGA 402 that is reconfigured based on the configuration data, and in the present embodiment, is configured including a plurality of computation circuits required to implement the analysis processing function. The computation processing unit 412 executes various types of computation operations, including inference processing based on the data of the inference model loaded into the RAM 405, and derives analysis results. The derived analysis results are transmitted to the image capturing apparatus 110 and/or stored in the RAM 405.

In this manner, the FPGA 402 changes the content of the analysis processing executed by the computation processing unit 412 in response to receiving a switching instruction that specifies one of a plurality of types of analysis processing for which the information for processing is stored in advance in the ROM 404. In other words, the detachable device 100 can selectively provide at least one of a plurality of types of processing functions to the connected image capturing apparatus 110. In addition, the detachable device 100 may be capable of changing the processing functions that can be provided to the attached apparatus as compatible configuration data, information, and the like are newly added as needed. Note that in the following, having a plurality of processing functions will be expressed as having information for processing corresponding to each of the plurality of types of processing functions stored in the ROM 404 and being capable of providing such processing functions in response to receiving the corresponding switching instruction (and execution instruction). In other words, if the content of the processing by the computation processing unit 412 can be changed by information for processing for other processing functions even when the FPGA 402 of the detachable device 100 is configured to execute one processing function, this is expressed as having a plurality of processing functions.

The SD controller 403 is a publicly-known control integrated circuit (IC), as defined in the SD standard, that controls slave operations according to the SD protocol and the reading/writing of data from/to the ROM 404 and the RAM 405.

The ROM 404 is non-volatile memory capable of permanently storing information, such as NAND flash memory or the like, for example. The ROM 404 stores various information such as, for example, storage data written from the image capturing apparatus 110, information for processing loaded in the RAM 405, configuration data for the FPGA 402, and the like.

The RAM 405 is volatile memory, such as DRAM or the like, that can temporarily store information. In the present embodiment, the RAM 405 is used by dividing regions thereof into the following three parts according to the application. The first region is a region that stores the data of the inference model used in the analysis processing to be executed, and in which the data based on the information for processing read out by the processing switching unit 411 is loaded. The second region is a region that is used as what is known as "work memory", where images to be processed, intermediate images output during the processing, and the like are stored. The third region is the remaining region, which is not classified into the two aforementioned regions. These sections will be identified by being referred to below as an "inference model region (the first region)", a "work region (the second region)", and a "preliminary region (the third region)", respectively. Here, the inference model region corresponds to a "first region" according to the present invention, the work region corresponds to a "third region" according to the same, and the preliminary region corresponds to a "second region" according to the same.

Functional Configuration of Detachable Device 100

FIG. 5 illustrates an example of the functional configuration of the detachable device 100. In the detachable device 100 according to the present embodiment, the FPGA 402 is reconfigured to enable the execution of the analysis processing, and thus the functional configuration of the detachable device 100 includes, for example, an analysis unit 501 and a communication unit 502. The analysis unit 501 executes analysis processing on images.

The analysis unit 501, for example, executes settings to put the input analysis process into an executable state when a switching request for the analysis processing or a configuration request is input Additionally, when an image is input, the analysis unit 501 executes the analysis processing which has been set to an executable state on the input image. Although the present embodiment describes the analysis processing that can be executed by the analysis unit 501 as human body detection processing and face detection processing, which are implemented by varying the inference models used, the analysis processing is not limited thereto. The analysis processing that can be executed by the analysis unit 501 may be processing for determining whether a person stored in advance is included in the image (facial authentication processing; described later). In this case, for example, the analysis unit 501 derives a degree of agreement between an image feature of the person stored in advance and an image feature of a person detected in the input image, and determines that the person is the person stored in advance if the degree of agreement is at least a threshold. The analysis processing that can be executed by the analysis unit 501 may be processing in which a predetermined mask image is superimposed, mosaic processing is applied, or the like to a person detected in the input image for the purpose of protecting privacy. The analysis processing that can be executed by the analysis unit 501 may be processing for detecting whether a person in an image is engaging in specific behavior using a learning model that has learned specific behavior of a person through machine learning. Furthermore, the analysis processing that can be executed by the analysis unit 501 may be processing for determining what kind of subject a region in the image indicates. In this case, for example, the analysis unit 501 performs processing for determining what kind of subject the region in the image indicates, using a learning model that has been trained by machine learning on buildings, roads, human, the sky, and the like. As described above, the processing that can be executed by the analysis unit 501 is not limited to processing which uses machine learning models. Each of the above types of analysis processing may be executed in cooperation with the image capturing apparatus 110, as opposed to by the detachable device 100 alone.

The communication unit 502 communicates information with the image capturing apparatus 110 through the I/F 401.

Hard ware Configuration of Input/Output Apparatus

Figure 6:
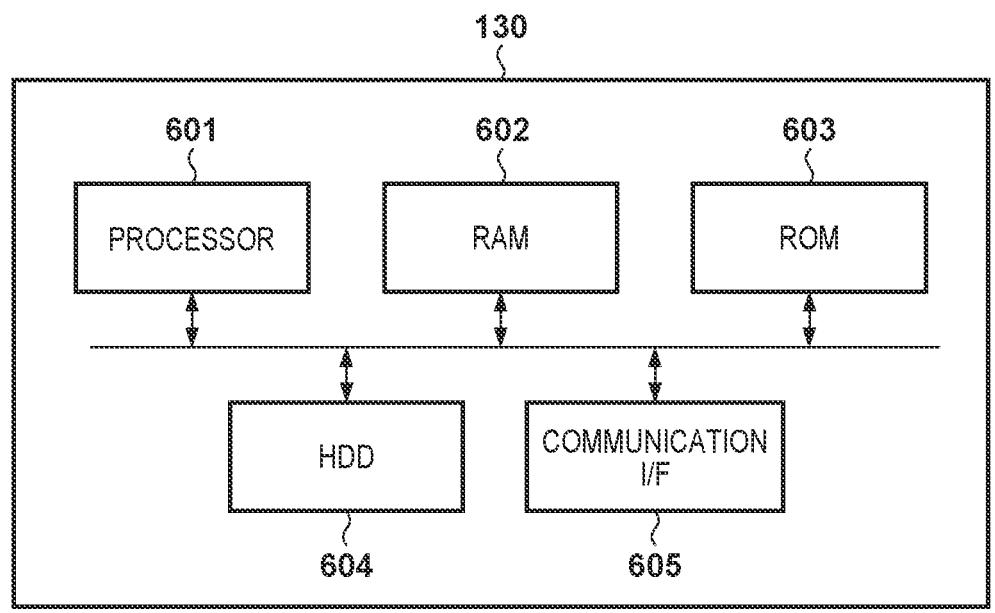
FIG. 6 is a block diagram illustrating an example of the hardware configuration of an input/output apparatus according to the embodiments and variation of the present invention.

FIG. 6 is a diagram illustrating an example of the hardware configuration of the input/output apparatus 130, The input/output apparatus 130 is configured as a computer such as a general PC or the like, and for example, as illustrated in FIG. 6, is configured including a processor 601 such as a CPU or the like, memory such as RAM 602 and ROM 603, a storage apparatus such as an HDD 604, and a communication 605, The input/output apparatus 130 can implement various functions by the processor 601 loading a program stored in a storage apparatus such as the RAM 602 or the HDD 604 into the RAM 602 and executing the program.

Functional Configuration of Input/Output Apparatus

Figure 7:
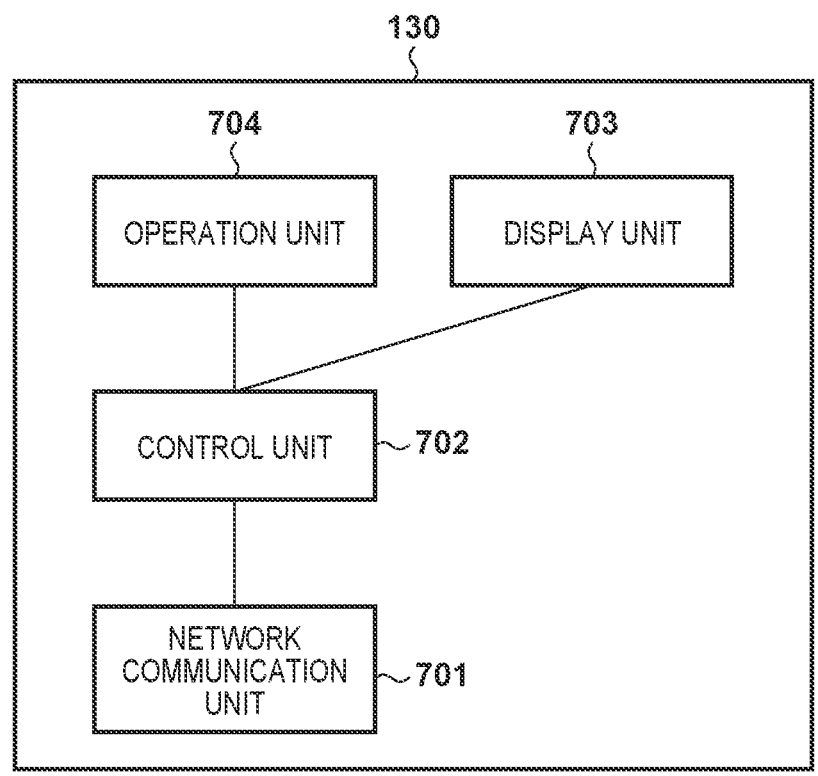
FIG. 7 is a block diagram illustrating an example of the functional configuration of the input/output apparatus according to the embodiments and variation of the present invention.

FIG. 7 illustrates an example of the functional configuration of the input/output apparatus 130 according to the present embodiment. The input/output apparatus 130 includes, as its functional configuration, a network communication unit 701, a control unit 702, a display unit 703, and an operation unit 704, for example. The network communication unit 701, for example, connects to the network 120 and executes communication with external apparatuses such as the image capturing apparatus 110 over the network 120. This is only one example, however, and for example, the network communication unit 701 may be configured to establish a communication connection with the image capturing apparatus 110 and communicate directly with the image capturing apparatus 110 without going through the network 120 or other apparatuses. The control unit 702 controls the network communication unit 701, the display unit 703, and the operation unit 704 to execute the respective processing thereof. The display unit 703 is a display, for example, that presents information to the user through a screen display. In the present embodiment, the information is assumed to be presented by displaying results rendered by the browser in the display unit 703. The information may be presented by the input/output apparatus 130 through methods other than screen displays, such as using audio, vibrations, or the like. The operation unit 704 accepts operation inputs from the user. In the present embodiment, the operation unit 704 includes a mouse and a keyboard, and is assumed to accept operation inputs to the browser is accepted when these are operated by the user. However, the configuration is not limited thereto, and the operation unit 704 may be another device capable of detecting any form of operation input by the user, such as a touch panel, a microphone, or the like, for example.

User Interface of Image Analysis System

Figure 20:
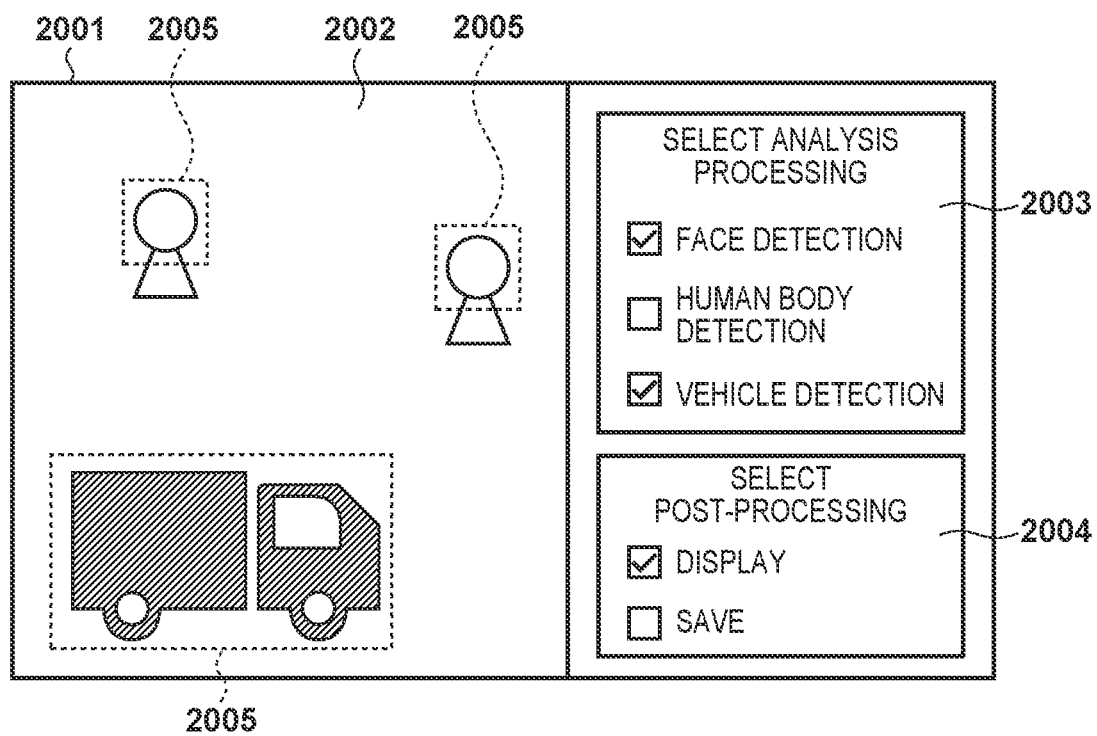
FIG. 20 is a diagram illustrating an example of a user interface presented in the input/output apparatus of the image analysis system according to the embodiments and variation of the present invention.

In the image analysis system according to the present embodiment, the input/output apparatus 130 provides a user interface that enables the user to select processing to be executed on captured images obtained by the image capturing apparatus 110, The user interface may be presented through the display unit 703, for example, as a GUI 2001, illustrated in FIG. 20.

In the example illustrated in FIG. 20, the GUI 2001 includes a captured image display region 2002 that displays a captured image obtained by at least one of the image capturing apparatuses 110. The GUI 2001 also includes an analysis processing selection region 2003 that accepts the selection of analysis processing to be executed on the captured image, and a post-processing selection region 2004 that accepts the selection of post-processing to be executed on the result of the analysis processing (the analysis result).

Here, if the detachable device 100 is mounted to the image capturing apparatus 110, analysis processing that can be executed by the detachable device 100 is displayed in the analysis processing selection region 2003 in addition to the analysis processing that can be executed by the image capturing apparatus 110 alone. In the example illustrated here, three types of processing, namely "face detection", "human body detection", and "vehicle detection", are indicated as selectable analysis processing, but the analysis processing displayed in the analysis processing selection region 2003 can change according to the image capturing apparatuses 110 within the image analysis system and the mounted detachable device 100. The user can specify the analysis processing to be executed by performing a selection operation for the analysis processing displayed in the analysis processing selection region 2003 (checking a check box, in the example illustrated here). In the example illustrated here, two types of analysis processing, namely "face detection" and "vehicle detection," have been selected, but any number of analysis processing can be selected in the GUI 2001. Additionally, the configuration may be such that when one process is selected, other processing is not selected, e.g., if "human body detection" is selected in a state where "face detection" is selected, then "face detection" is deselected.

The post-processing selection region 2004 displays the post-processing that can be executed on the analysis results when the analysis processing selected in the analysis processing selection region 2003 is executed. In the example illustrated here, two types of post-processing that can be selected, namely "display" and "save", are indicated, but it goes without saying that the configuration is not limited thereto, and others may be included. Similar to the analysis processing selection region 2003, the user can specify the post-processing to be executed by performing a selection operation for the post-processing displayed in the post-processing selection region 2004. In the example illustrated here, the "display" post-processing is selected, but any number of post-processing may be capable of being selected in the GUI 2001. When the "display" post-processing is selected, a result frame 2005 pertaining to the analysis result may be superimposed on the captured image displayed in the captured image display region 2002, as illustrated here. The result frame 2005 is superimposed at the coordinates of the detected target in the captured image displayed in the captured image display region 2002. The shape of the result frame 2005 is not limited to a rectangle, and may be any shape, e.g., an oval or the like. The shape, color, and the like of the result frame 2005 may be changed according to the detected target, attributes, and the like.

Information on the analysis processing and the post-processing selected in the GUI 2001 is transmitted to each of the image capturing apparatuses 110 and used to control the operations thereof.

Flow of Processing

An example of the flow of processing executed in the image analysis system according to the present embodiment will be described next. Of the following processing, processing executed by the image capturing apparatus 110 is realized, for example, by a processor in the computation processing unit 203 executing a program stored in memory or the like. However, this is only one example, and some or all of the processing described below may be realized by dedicated hardware. The processing executed by the detachable device 100, the input/output apparatus 130, and the like may also be realized by a processor in each device executing a program stored in memory or the like, or part or all of the processing may be realized by dedicated hardware.

Overall Flow

FIG. 8 schematically illustrates a sequence of analysis processing executed in the image analysis system. The processing illustrated in FIG. 8 will be described here as starting when the detachable device 100, which is the computing apparatus, is mounted to the image capturing apparatus 110, and includes the execution of the analysis processing as a sequence flow. However, the analysis processing is not limited to processing se to be executed when the detachable device 100 is attached, and can be executed at any timing in response to reception of an execution request.

In the processing illustrated here, the image capturing apparatus 110 first detects that the detachable device 100 has been mounted (step S801). The image capturing apparatus 110 then executes an initialization sequence for the mounted detachable device 100 (step S802), The initialization sequence is performed by transmitting and receiving predetermined commands between the image capturing apparatus 110 and the detachable device 100, and upon completion, the image capturing apparatus 110 is capable of using the detachable device 100.

The image capturing apparatus 110 then ascertains the processing that can be executed by the detachable device 100 and the processing that can be executed locally (by at least one of the image capturing apparatus 110 and the mounted detachable device 100) (step S803). Here, for example, if a list of processing that can be executed using the image analysis system is supplied in advance from the input/output apparatus 130, the image capturing apparatus 110 may hold the list and refer to the to ascertain the processing that can be executed locally. In this case, when the image capturing apparatus 110 obtains the processing that can be executed by the detachable device 100, it is sufficient to ascertain which of this processing is included in the above-mentioned list. The processing that can be executed locally in the image capturing apparatus 110, ascertained in step S803, is the processing displayed in the analysis processing selection region 2003 and the post-processing selection region 2004 of the GUI 2001.

The image capturing apparatus 110 then determines the processing to be executed and, if necessary, executes configurations for the detachable device 100 (step S804). If at least part of the process determined to be executed is to be executed by the detachable device 100, the configurations for the detachable device 100 for that processing are executed. In these configurations, for example, the FPGA 402 can be reconfigured using the configuration data corresponding to the processing to be executed, and the data of the corresponding inference model (information for processing) can be loaded into the inference model region. The determination of the processing to be executed may be based on the information of the processing selected through the GUI 2001 in the input/output apparatus 130. The image capturing apparatus 110 or the detachable device 100 then executes the analysis processing (step S805). The image capturing apparatus 110 then executes post-processing step S806).

The processing of steps S805 and S806 may be repeatedly executed for a single captured image. In other words, in a situation where a plurality of types of processing are executed on a single captured image, a situation inhere processing is performed on each divided image obtained by dividing a single captured image, or the like, steps S805 and S806 may be repeatedly executed as appropriate. Additionally, although the processing in FIG. 8 is executed when the detachable device 100 is attached, at least part of the processing may also be executed at predetermined times, e.g., when the detachable device 100 is removed, and the processing in step S803 is executed again to re-ascertain the processing that can be executed locally.

Processing of Ascertaining Processing that can be Executed Locally

FIG. 9 illustrates an example of the flow of processing for ascertaining processing that can be executed locally in the image capturing apparatus 110. This processing corresponds to step S803 in FIG. 8, and can be executed when a device such as the detachable device 100 is attached to the image capturing apparatus 110 or removed from the image capturing apparatus 110, when the power of the image capturing apparatus 110 is turned on, or the like. In this processing, the image capturing apparatus 110 reads out the processing that can be executed by the detachable device 100, integrates this with the analysis processing that can be executed by the image capturing apparatus 110 alone, and ascertains the analysis processing that can be executed locally.

First, the control unit 304 of the image capturing apparatus 110 reads out the first processing list, which is a list of processing that can be executed in the analysis unit 305 of the image capturing apparatus 110 and is stored in the storage unit 303 (step S901). The control unit 304 then determines whether the attached device is, for example, a device having only a conventional recording function or a device having specific processing functions (a computing apparatus) such as the detachable device 100 (step S902), For example, the control unit 304 controls the device communication unit 306 to issue a readout request (a read command) to the attached device for information at a specific address in the ROM 404, and makes a determination based on the information read out. Here, the information stored at the specific address in the ROM 404 includes flag data indicating whether the computing apparatus is configured to be capable of executing specific analysis processing. In the following, this specific address may be referred to as "address A". The information stored at address A includes items aside from just flag data, and details thereof will be given below. Accordingly, based on the flag data read out, the control unit 304 determines whether the attached device is a computing apparatus having a specific processing function. However, the flag data based determination method is only one example, and other methods may be used to determine whether the attached device is a computing apparatus.

If the attached device is a computing apparatus (YES in step S902), the control unit 304 executes processing for ascertaining the processing that can be executed in that device (the detachable device 100). The control unit 304 controls the device communication unit 306 to communicate with the detachable device 100 and obtain a list of the processing that can be executed in the detachable device 100 (referred as a "second processing list" hereinafter) (step S903). Here, the second processing list may include processing that can be executed by reconfiguring the FPGA 402 and processing that can be executed by changing the data in the inference model. In other words, the processing to be included in the second processing list is determined according to the configuration data and the information for processing stored in the ROM 404. The control unit 304 obtains the second processing list stored separately from the flag data at address A in the ROM 404, for example, similar to when determining whether the detachable device 100 is a computing apparatus. In this situation, the image capturing apparatus 110 can simultaneously obtain the flag data and the second processing list by making a readout request for address A, and simultaneously execute the processing of steps S902 and S903. However, the storage location is not limited thereto, and these data may be stored at different addresses in the detachable device 100. The control unit 304 then generates an integrated processing list that integrates and merges the first processing list of processing that can be executed by the image capturing apparatus 110 itself, read out from the storage unit 303, and the second processing list obtained from the detachable device 100 (step S904), after which the processing ends.

This integrated processing list is a list of processing that can be executed locally by the image capturing apparatus 110, rather than processing performed through an apparatus such as a server on the network. Note that in the present embodiment, the integrated processing list is a list obtained as a union of the processing included in the first processing list and the processing included in the second processing list, and is a list of the processing included in at least one of the first processing list and the second processing list. However, the configuration is not limited thereto, and for example, when another instance of processing can be executed by combining processing in the first processing list with processing in the second processing list, that other instance of processing that can be executed may be added to the integrated processing list. In other words, if at least some of the processing included in the first processing list and at least some of the processing included in the second processing list can be used together to enable new analysis processing to be executed, information on that analysis processing can be included in the integrated processing list. For example, facial authentication processing can be realized by a function group including a face detection processing function, a facial feature extraction processing function, and a facial feature matching processing function. At this time, if the first processing list includes the face detection processing function and the facial feature extra-non processing function, and the second processing list includes the facial feature matching processing function, then the integrated processing list can include the facial authentication processing.

If the attached device is not a computing apparatus (NO in step S902), the control unit 304 determines that there is no processing that can be executed by the attached device. In other words, because the second processing list is not read out from the attached device, the control unit 304 does not include the processing executed by the attached device as processing that can be executed locally. Accordingly, the control unit 304 reads out, from the storage unit 303, the first processing list of processing that can be executed in its own device as the integrated processing list of processing that can be executed locally (step S905), after which the processing ends. Note that if the processing in FIG. 9 is executed when the device is removed, the computing apparatus is of course no longer attached, and thus the first processing list will be treated as an integrated processing list as a result.

This makes it possible to create a list of processing that can be executed locally in the image capturing apparatus 110 based on whether a detachable device 100 capable of executing specific processing is attached to the image capturing apparatus 110, By transmitting the integrated processing list to the input/output apparatus 130, an analysis processing group pertaining to the integrated processing list can be presented to the user, as in the analysis processing selection region 2003 of the GUI 2001, such that the user can select the processing to be executed by the image capturing apparatus 110.

Although the present embodiment describes a case in which an integrated processing list is generated as an example, the first processing list and the second processing list may be managed separately, without generating the integrated processing list. In other words, processing that can be executed by the detachable device 100 and processing that can be executed by the image capturing apparatus 110 without the detachable device 100 may be managed in a distinguishable manner and provided to the input/output apparatus 130. Additionally, even if the first processing list and the second processing list are managed separately, an integrated processing list may be further generated and managed. For example, when new processing can be executed by using both the processing included in the first processing list and the processing included in the second processing list, the new processing is included in the integrated processing list, but not in the first processing list and the second processing list. Note also that when the integrated processing list is output, information making it possible to distinguish whether the processing included in the integrated processing list is included in the first processing list or the second processing list can also be output. This enables the user to recognize, for example, whether processing presented in the input/output apparatus 130 is processing that can be executed without the detachable device 100.

Although the processing lists described above are provided to an external apparatus not included in at least the image capturing apparatus 110, such as the input/output apparatus 130, as will be described later; however, not that the processing lists need not be provided to an external apparatus, or may be presented in the image capturing apparatus 110 along with being provided to an external apparatus. For example, if the image capturing apparatus 110 has a display, the processing lists may be presented by displaying the processing lists in the display, or if the image capturing apparatus 110 has an audio output function, the processing lists may be presented by audio output or the like of the processing included in the processing lists. By presenting the processing lists in the image capturing apparatus 110, if a detachable device 100 having a processing function different than that intended is mistakenly attached to the image capturing apparatus 110 or the like, the user can quickly recognize that mistaken attachment. In this manner, the image capturing apparatus 110 can output, in any format, information based on the first processing list indicating the processing that the image capturing apparatus 110 can execute and the second processing list indicating the processing that the detachable device 100 can execute.

If the detachable device 100 is detached, the image capturing apparatus 110 can update the integrated processing list by re-executing the processing illustrated in FIG. 9. At this time, the image capturing apparatus 110 can also discard the second processing list for the detachable device 100 that was detached. However, the configuration is not limited thereto, and the image capturing apparatus 110 can separately store a second processing list for a given detachable device 100 in the storage unit 303 and output that second processing list even when that detachable device 100 is not attached. In other words, the image capturing apparatus 110 may be configured to output the second processing list for detachable devices 100 that have been attached and removed in the past. The image capturing apparatus 110 may also output information indicating processing that can be executed using the processing included in the second processing list for a detachable device 100 that was attached and detached in the past and the processing included in the first processing list (that can be executed by the apparatus itself). In other words, the image capturing apparatus 110 can output information on processing that cannot be executed by the apparatus alone. According to this, the user can be notified that there is a detachable device 100 that can execute the processing indicated by the output second processing list, and that the detachable device 100 being attached will enable that processing to be executed.

Furthermore, the image capturing apparatus 110 may be configured to output the second processing list for other detachable devices 100 (unattached devices) that can be attached, even if the devices have no history of actually being attached. Information indicating such unattached devices and the analysis processing that can be executed by such unattached devices may, for example, be obtained by the image capturing apparatus 110 from an external server (not shown) over a network. Alternatively, information indicating unattached devices and the analysis processing that can be executed by such unattached devices may be held in advance by the image capturing apparatus 110, for example.

The image capturing apparatus 110 may also output information indicating the processing that can be executed using the processing included in the second processing list for unattached devices and the processing included in the first processing list (that can be executed by the apparatus itself). In other words, the image capturing apparatus 110 can output information on processing that cannot be executed by the apparatus alone. According to this, the user can be notified that there is a detachable device 100 that can execute the processing indicated by the output information, and that the detachable device 100 being attached will enable that processing to be executed.

Note that when storing the second processing list for a detachable device 100 that has been attached and detached in the past, the image capturing apparatus 110 can also store information that can identify the device, such as the model number or the like of the detachable device 100. When the image capturing apparatus 110 outputs the second processing list pertaining to that detachable device 100, the information that can identify the detachable device 100 can also be output. This enables the user to easily recognize which detachable device 100 should be attached to the image capturing apparatus 110 in order to use the processing functions presented.

Processing for Determining Analysis Processing Content

FIG. 10 illustrates an example of the flow of processing for determining the content of the analysis processing to be performed by the image capturing apparatus 110 and the detachable device 100, and for reconfiguring the detachable device 100 and loading the information for processing as needed such that the analysis processing can be executed. This processing corresponds to the processing executed prior to step S804 and the processing of step S804 in FIG. 8, and is executed between the input/output apparatus 130 and the image capturing apparatus 110 (and the detachable device 100). In this processing, information on analysis processing that can be executed locally in the image capturing apparatus 110 is transmitted to the input/output apparatus 130 and presented through the GUI 2001, and an operation input to select at least one of these instances of processing is accepted through the input/output apparatus 130. The image capturing apparatus 110 then determines the analysis processing to be executed locally based on the information on the selection.

First, the control unit 702 of the input/output apparatus 130 controls the network communication unit 701 to execute communication with the image capturing apparatus 110 and request the obtainment of a captured image, the integrated processing list, and the post-processing list (step S1001). As one example, the input/output apparatus 130 requests the image capturing apparatus 110 to transmit information by transmitting a request message specified in the ONVIF standard to the image capturing apparatus 110. It goes without saying, however, that the request for transmitting the information is not limited thereto, and may be made through another message or the like.

As illustrated in FIG. 20, in the image analysis system according to the present embodiment, when the analysis processing to be executed by the image capturing apparatus 110 (and the detachable device 100) is selected in the input/output apparatus 130, that analysis processing is presented along with the captured image obtained by the detachable device 100. Accordingly, in the processing illustrated in FIG. 10, an obtainment request for the captured image is made along with an obtainment request for the integrated processing list and the post-processing list. However, the presentation of the captured images is not necessary when executing the processing for determining the content of the analysis processing, and the transmission of the obtainment request for the captured image, the obtainment processing for the captured image, and the transmission processing for the captured image (described later) need not be performed.

In the image capturing apparatus 110, the image capturing control unit 301 captures an image of the surrounding environment based on the obtainment request from the input/output apparatus 130, and the control unit 304 controls the signal processing unit 302 to process the image captured by the image capturing control unit 301 to obtain a captured image (step S1002). In a surveillance system application, the image capturing apparatus 110 may continue to obtain captured images of the surrounding environment regardless of whether or not there is a request. At this time, the captured image obtained by the image capturing apparatus 110 may be stored locally in the image capturing apparatus 110, or may be transferred to and stored in another device such as a network server. [0100.] The control unit 304 reads out the post-processing list stored in the storage unit 303 based on the obtainment request from the input/output apparatus 130. In the present embodiment, the post-processing list is assumed to include display processing and saving processing as illustrated in FIG. 20, but is not limited thereto. The control unit 304 controls the network communication unit 307 to transmit the post-processing list, the integrated processing list obtained through the processing illustrated in FIG. 9, and the captured image obtained in step S1002 to the input/output apparatus 130 (step S1003), As an example, the image capturing apparatus 110 transmits information to the input/output apparatus 130 by transmitting, to the input/output apparatus 130, a response message to the request message specified in the ONVIF standard mentioned above. However, the method of transmitting the information is not limited thereto, and the information may be transmitted using another message or the like.

The control unit 702 of the input/output apparatus 130 controls the network communication unit 701 to receive the captured image, the integrated processing list, and the post-processing list from the image capturing apparatus 110, Then, the control unit 702 controls the display unit 703 to present the integrated processing list and the post-processing list as the GUI 2001 being displayed in the screen (step S1004). At this time, the control unit 702 may also present the captured image in the form of a screen display.

The control unit 702 of the input/output apparatus 130 then accepts an operation input for selecting analysis processing (referred to as "designated analysis processing" hereinafter) to be executed by the detachable device 100 (and the image capturing apparatus 110) for the integrated processing list displayed in the display unit 703 (step S1005). Similarly, the control unit 702 accepts an operation input for selecting post-processing to be executed on the result of the designated analysis processing (referred to as "designated post-processing" hereinafter) (step S1006). Information on the operation inputs pertaining to the various selections made (information on the designated analysis processing and the designated post-processing, or information on the operation inputs themselves made for the selection of this processing) is output to the control unit 702 by the operation unit 704. After accepting the selection of the designated analysis processing and the designated post-processing, the control unit 702 controls the network communication unit 701 to transmit the information indicating this processing to the image capturing apparatus 110 (step S1007).

The control unit 304 of the image capturing apparatus 110 controls the network communication unit 307, and when the information indicating the designated analysis processing is received from the input/output apparatus 130, determines whether the designated analysis processing is processing included in the second processing list (step S1008). If the designated analysis processing is not processing included in the second processing list (NO in step S1008), the process is executed in the image capturing apparatus 110, and thus the control unit 304 ends the processing in FIG. 10 without notifying the detachable device 100 and the like. On the other hand, if the designated analysis processing is processing included in the second processing list (YES in step S1008), the control unit 304 controls the device communication unit 306 to transmit a configuration request for the designated analysis processing to the detachable device 100 (step S1009).

The communication unit 502 of the detachable device 100 receives the configuration request for the designated analysis processing from the image capturing apparatus 110. At this time, the communication unit 502 can identify the configuration request for the designated analysis processing by the amount of data written from the image capturing apparatus 110, and the type of write command, and the like. The communication unit 502 outputs, to the analysis unit 501, the configuration request for the designated analysis processing received from the image capturing apparatus 110.

The analysis unit 501 executes configurations to enable the designated analysis processing to be executed based on the configuration request for the designated analysis processing input from the communication unit 502 (step S1010), More specifically, the processing switching unit 411 of the detachable device 100 reconfigures the computation processing unit 412 based on the configuration data and loads the necessary information for processing into the RAM 405, and as a result, the state of the FPGA 402 is controlled so that the designated analysis processing can be executed.

The communication unit 502, for example, transmits a configuration completion notification to the image capturing apparatus 110 after the configuration by the analysis unit 501 is completed (step S1011), The configuration completion notification is made to ensure that data is not written from the image capturing apparatus 110 at a timing at which the configuration of the detachable device 100 is incomplete. Therefore, the communication unit 502 only needs to be able to notify the image capturing apparatus 110 that the configuration of the detachable device 100 is complete, and may communicate information such as the timing at which the reconfiguration is complete to the image capturing apparatus 110 before the configuration is actually completed. The control unit 304 of the image capturing apparatus 110 controls the device communication unit 306 to receive the configuration completion notification from the detachable device 100.

The configuration completion notification from the detachable device 100 to the image capturing apparatus 110 can be executed, for example, using one of the following three methods. In a first notification method, the communication unit 502 outputs a BUSY signal if the configurations that enable the analysis unit 501 to execute the designated analysis processing have not been completed when processing for writing the first block of data received from the image capturing apparatus 110 is performed. The BUSY signal is output, for example, by driving a DMA signal line defined in the SD standard to a Low state. In this case, the image capturing apparatus 110 can determine whether the configurations for the designated analysis processing are complete by checking the BUSY signal. In a second notification method, information on the time until the configurations for the designated analysis processing are completed is stored in advance, for example, at address A in the ROM 404, and the image capturing apparatus 110 reads out that information on the time. Accordingly, the image capturing apparatus 110 stands by for a time until the configurations pertaining to the designated analysis processing are completed before making outputs related to subsequent data writing (issuing write commands). By doing so, the image capturing apparatus 110 can input the data of the captured image to which the designated analysis processing is applied after the configurations pertaining to the designated analysis processing have been completed. In a third notification method, upon completing the configurations for the designated analysis processing, the analysis unit 501 writes flag data indicating that the configurations are complete into a specific address different from address A (that is, address B) in the ROM 404, for example. In this case, the image capturing apparatus 110 can determine whether the configurations for the designated analysis processing are complete by reading out the data at address B. Note that the information at address B, where the flag data indicating the completion of the configurations is written, may be transmitted to the image capturing apparatus 110 by including that information in the information stored at address A described above, or may be transmitted using another method, for example.

Accordingly, the integrated processing list configured according to the attachment status of the detachable device 100 to the image capturing apparatus 110, or the processing functions that the attached detachable device 100 can provide, is provided to the input/output apparatus 130 as indicated by the processing illustrated in FIG. 10. This enables the user of the input/output apparatus 130 to select the designated analysis processing having taken into account the state of the functional expansion of the image capturing apparatus 110. If the designated analysis processing is processing that can be executed in the detachable device 100, the processing switching unit 411 performs the reconfiguration and the loading of the data of the inference model such that the designated analysis processing can be executed without requiring any configuration operations by the user. This also makes it possible to prevent unnecessary configurations of the detachable devices 100 from being made when the designated analysis processing does not include processing that can be executed by the detachable device 100 and the image capturing apparatus 110 alone performs the designated analysis processing.

Execution Control of Designated Analysis Processing

FIG. 11 illustrates an example of the flow of control when executing the designated analysis processing locally in the image capturing apparatus 110. This processing corresponds to the processing in step S805 of FIG. 8 and is executed by the image capturing apparatus 110 and the detachable device 100.

In this processing, first, a captured image to be subjected to the designated analysis processing is obtained (step S1101). More specifically, in response to the image capturing control unit 301 capturing an image of the surrounding environment, the control unit 304 controls the signal processing unit 302 to execute various types of processing to obtain the captured image. In the processing illustrated in FIG. 11, one type of analysis processing (a series of pre-analysis processing, analysis processing, and post-analysis processing) is assumed to be executed on one captured image as the designated analysis processing, and thus a captured image is obtained in step S1101. However, it is easily understood, for example, that the obtainment of a captured image is not necessary for each instance of analysis processing in a situation where a plurality of types of analysis processing are executed while being switched. Additionally, the image to which the designated analysis processing is applied need not be one captured at the time of the execution of the designated analysis processing.

After the captured image is obtained, the control unit 304 controls the analysis unit 305 to execute the pre-analysis processing of the designated analysis processing on the captured image and obtain a resulting image (step S1102). The pre-analysis processing may be, for example, processing the dividing the captured image into a plurality of regions, in which case the resulting image of the pre-analysis processing is a divided image. Note that the pre-analysis processing may vary depending on the designated analysis processing, and for example, if the entire captured image is within an input data size of the designated analysis processing, the processing for dividing the image into regions need not be performed. Alternatively, even if the entire captured image is not within the input data size, the pre-analysis processing may resize the captured image to the input data size without dividing the captured image. The pre-analysis processing may perform both region division and resizing processing.

The control unit 304 then determines whether the designated analysis processing is processing included in the second processing list (step S1103). In other words, the control unit 304 determines whether the designated analysis processing is processing that can be executed by the detachable device 100.

If the designated analysis processing is determined not to be processing included in the second processing list (NO in step S1103), the control unit 304 controls the analysis unit 305 to execute the designated analysis processing on the resulting image from the pre-analysis processing (step S1104). In other words, the designated analysis processing is executed in the image capturing apparatus 110, and an analysis result is derived. Then, the control unit 304 controls the analysis unit 305 to execute the post-analysis processing of the designated analysis processing on the analysis result (step S1108), after which this processing ends. Here, the post-analysis processing may include, for example, processing in which the analysis results obtained for all divided images are integrated and ultimately output as an analysis result for the entire captured image, in a situation in which the captured image is divided and the designated analysis processing is sequentially executed.

If the designated analysis processing is processing included in the second processing list (YES in step S1103), the control unit 304 controls the device communication unit 306 to transmit the resulting image from the pre-analysis processing to the detachable device 100 (step S1105). For example, the control unit 304 issues a write request (a write command) for the resulting image from the pre-analysis processing to realize the transmission of the resulting image to the detachable device 100. Upon receiving the resulting image from the pre-analysis processing from the image capturing apparatus 110, the communication unit 502 of the detachable device 100 outputs the resulting image to the analysis unit 501. Specifically, the resulting image received via the I/F 401 is transmitted by the input/output control unit 410 to the RAM 405 and stored in the work region.

The analysis unit 501 executes the designated analysis processing on the resulting image input from the communication unit 502 and derives an analysis result (step S1106). Because the analysis unit 501 is configured to be able to execute the designated analysis processing by the processing executed prior to this processing (the processing of step S1010 in FIG. 10), the processing is executed in response to receiving an analysis start command, for example. The communication unit 502 then transmits the analysis result from the designated analysis processing by the analysis unit 501 to the image capturing apparatus 110 (step S1107). The control unit 304 of the image capturing apparatus 110 controls the device communication unit 306 to receive the analysis result from the detachable device 100. Then, the control unit 304 controls the analysis unit 305 to execute the post-analysis processing of the designated analysis processing on the analysis result (step S1108).

The transmission of the analysis result from the detachable device 100 to the image capturing apparatus 110 max be realized, for example, as follows.

The analysis unit 501 of the detachable device 100 stores the analysis result at a storage destination address in the RAM 405 allocated for each instance of the designated analysis processing. More specifically, when the computation processing unit 412 completes the execution of the designated analysis processing for the input image, the SD controller 403 stores the analysis result thereof at the storage destination address in the RAM 405. The information on the storage destination address may, for example, be included in the second processing list, and the control unit 304 of the image capturing apparatus 110 can identify the storage destination address based on the second processing list received from the image capturing apparatus 110. Then, based on the information of the storage destination address pertaining to the designated analysis processing, for example, the control unit 304 issues a readout request (read command; result output command) for that storage destination address, and transmits that request through the device communication unit 306.

Then, upon receiving the readout request for the storage destination address of the analysis result, the analysis unit 501 of the detachable devices 100 returns the analysis result to the image capturing apparatus 110 through the communication unit 502. More specifically, upon receiving the readout request through the I/F 401, the input/output control unit 410 obtains the analysis result stored at the storage destination address in the RAM 405 through the SD controller 403 and transmits the analysis result to the I/F 401 to be returned to the image capturing apparatus 110. This enables the image capturing apparatus 110 to obtain an analysis result pertaining to the designated analysis processing from the detachable device 100.

Note that the issuance of the readout request by the control unit 304 for the storage destination address may be controlled, for example, in response to an estimated processing time for the designated analysis processing elapsing following the transmission of the analysis start command. In the present embodiment, information on the estimated processing time is included in the second processing list for each of the plurality of types of processing that can be executed by the detachable device 100, and the control unit 304 controls the issuance based on the information in that list, obtained from the detachable device 100 which is mounted. Alternatively, in a situation in which the communication unit 502 of the detachable device 100 outputs a BUSY signal from when the write request for the last block of the resulting image from the pre-analysis processing is made to when the designated analysis processing for that block is completed, the issuance may be controlled according to the output state of that signal. In this case, the control unit 304 may issue the readout request for the storage destination address in response to the BUSY signal no longer being received. By doing so, the control unit 304 can obtain the analysis result after the completion of the designated analysis processing. If no analysis result is returned or an error is returned in response to the issued readout request for the storage destination address, the control unit 304 may repeatedly issue (retry) the same request.

Through the processing described above, the image capturing apparatus 110 according to the present embodiment can obtain an analysis result efficiently or with high precision by varying the entity that executes the processing according to whether the designated analysis processing is analysis processing that can be executed in the detachable device 100. The control of such a change of the executing entity can be realized in the image capturing apparatus 110 without the user of the input/output apparatus 130 being aware of such control.

Execution Control of Designated. Post-Processing

FIG. 12 illustrates an example of the flow of control performed when the designated post-processing is executed in the image analysis system according to the present embodiment. This processing corresponds to the processing of step S806 in FIG. 8, and is executed between the image capturing apparatus 110 and the input/output apparatus 130. As illustrated in FIG. 20, in the image analysis system according to the present embodiment, display processing and saving processing are included as post-processing of information on the analysis result (output of post-analysis processing) obtained by executing the designated analysis processing for the entirety of a single captured image. Accordingly, when at least one of these is specified as the designated post-processing, the image capturing apparatuses 110 is controlled such that the designated post-processing is implemented in the corresponding device.

In this processing, First, the control unit 304 of the image capturing apparatus 110 determines whether the designated post-processing includes the display processing (step S1201). If the designated post-processing is determined to include the display processing (YES in step S1201), the control unit 304 controls the network communication unit 307 to transmit information on the analysis result to the input/output apparatus 130 (step S1202). When the analysis result is received from the image capturing apparatus 110, the control unit 702 of the input/output apparatus 130 controls the display unit 703 to present the result of the analysis processing through a screen display or the like (step S1203), On the other hand, if the control unit 304 determines that the designated post-processing does not include the display processing (NO in step S1201), the processing of steps S1202 and S1203 is not executed.

Additionally, the control unit 304 of the image capturing apparatus 110 determines whether the designated post-processing includes the saving processing (step S1204). If the designated post-processing is determined to include the saving processing (YES in step S1204), the control unit 304 controls the storage unit 303 to store the result of the analysis processing, and then ends the processing (step S1205). On the other hand, if the designated post-processing is determined not to include the saving processing (NO in step S1204), the control unit 304 ends the processing without executing step S1205.

In this manner, the image analysis system according to the present embodiment improves the convenience in that the way in which the analysis result is handled can be configured without the user having to operate each of the detachable devices 100 attached to the image capturing apparatuses 110. Although the example in FIG. 12 illustrates the determinations as being made in the order of display processing→saving processing, these determinations may be executed in any order, or simultaneously in parallel. Additionally, although the present embodiment describes the analysis result as being stored (saved) in the storage unit 303 when the designated post-processing includes the saying processing, it is to be understood that the save location of the analysis result is not limited thereto.

Communication between Image Capturing Apparatus 110 and Detachable Device 100

Communication between the image capturing apparatus 110 and the detachable device 100 will be described here. The computation processing unit 203 of the image capturing apparatus 110 and the SD controller 403 of the detachable device 100 are connected by a power supply line, a GND line, a clock line, a command line, and a data line via a device insertion socket of the SD I/F 205 of the image capturing apparatus 110. Note that the clock line, the command line, and the data line are assumed to be connected via the FPGA 402. A clock for synchronization, output from the computation processing unit 203, is communicated on the clock line, Commands issued from the computation processing unit 203 to the SD controller 403 for operation requests, and responses made by the SD controller 403 to the computation processing unit 203 in response to the commands, are communicated on the command line. Write data from the computation processing unit 203 and readout data from the detachable device 100 are communicated on the data line. The computation processing unit 203 can also recognize whether the detachable device 100 is inserted by determining whether a device detect signal from the device insertion socket of the SD I/F 205 is high or low.

The computation processing unit 203 issues commands on the command line to the SD controller 403 after power is supplied. The computation processing unit 203 then sets a voltage, communication speed (lock frequency), and the like for data communication in response to receiving the response from the SD controller 403 and output data indicating device information as an SD card.

FIGS. 13A and 13B illustrate examples of the configurations of the commands (FIG. 13A) and the responses (FIG. 13B) communicated on the command line. These commands and responses are configured in accordance with the SD standard. A command 1301 issued from the computation processing unit 203 to the SD controller 403 is configured including a command number part 1304, a command argument part 1305, and an error correction data part 1306. The command number part 1304 describes a value indicating the type of the command. For example, a value of "23" being stored in the command number part 1304 indicates that the command is a block number specification command that specifies a data block number. A value of "25" being stored in the command number part 1304 indicates that the command is a multi write command, and a value of "12" being stored in the command number part 1304 indicates that the command is a data transfer stop command. In the command argument part 1305, information such as a transfer data block number, memory write and read addresses, and the like is specified according to the type of command. A command start bit 1302, which indicates the start position of the command, is appended to the first bit of the command, and a command end bit 1307, which indicates the end of the command, is appended to the last bit of the command. A direction bit 1303, indicating that the signal is a signal output from the image capturing apparatus 110 to the detachable device 100, is also appended after the command start bit 1302.

A response 1311 returned by the SD controller 403 in response to the command from the computation processing unit 203 includes a response number part 1314 indicating which command the response is for, a response argument part 1315, and an error correction data part 1316. A response start bit 1312, which indicates the start position of the response, is appended to the first bit of the response, and a response end bit 1317, which indicates the end position of the response, is appended to the last bit of the response. A direction bit 1313, indicating that the signal is a signal output from the detachable device 100 to the image capturing apparatus 110, is also appended after the response start bit 1312. The response argument part 1315 stores information such as an SD card status according to the command type.

A method for transmitting and receiving data between the computation processing unit 203 and the detachable device 100 will be described next. In the SD I/F 205, data transfer is performed in units of block both when writing and reading out data.

The following two methods can be given as methods by which the computation processing unit 203 transfers a plurality of blocks of data to the detachable device 100. In a first method, after the number of blocks is specified by the block number specification command for transferred data, the specified number of blocks of data is transferred by a multi write command. In the block number specification command, the number of blocks of write data is specified in the command argument part 1305, and in the multi write command, the address of in the ROM 404 or the RAM 405 where the data is to be written is specified in the command argument part 1305. In the second method, data transfer is started by issuing a multi write command without issuing a block number specification command, and the processing is terminated by issuing a transfer stop command at the point in time when the data transfer ends. At this time, only the address of the ROM 404 or the RAM 405 to which the data is to be written is specified in the command argument part 1305 of the multi write command. The computation processing unit 203 can switch between the two writing methods as desired.

Note that when storage processing is performed, the FPGA 402 inputs the commands and data sent from the computation processing unit 203 to the SD controller 403 as—is, and the SD controller 403 stores the received data at the address in the ROM 404 specified by the command. When analysis processing is performed, the FPGA 402 executes the analysis processing on the data sent from computation processing unit 203, and outputs data of the processing result and information specifying a predetermined address in the RAM 405 to the SD controller 403, The SD controller 403 stores the processing results at the specified address in the RAM 405.

The following two methods can be given as methods by which the computation processing unit 203 reads out a plurality of blocks of data from the detachable device 100. In the first method, a multi read command is issued after the number of blocks is specified in the block number specification command, and the specified number of blocks of data is read out. In the block number specification command, the number of blocks of readout data is specified in the command argument part 1305, and the address of the ROM 404 or the RAM 405 from which the data is to be read out is specified in the command argument part 1305 of the multi read command. In the second method, data readout is started by issuing a multi read command without a block number specification command being issued, and the processing is terminated by issuing a transfer stop command. The computation processing unit 203 can switch between the two readout methods as desired.

Note that for a single block of write data or readout data, the data writing or and readout can be executed without issuing a block number specification command or a transfer stop command by issuing a single write command or a single read command. In the single write command and the single read command, the address of the ROM 404 or the RAM 405 to be accessed is specified in the command argument part 1305, in the same manner as described above.

The computation processing unit 203 can transmit the data subject to the storage processing or the analysis processing to the detachable device 100 by writing into the detachable device 100. By reading out from the detachable device 100, the computation processing unit 203 can obtain the image data stored in the ROM 404 or the RAM 405, the processing results of the analysis processing, and information on the image analysis processing functions of the detachable device 100 (the second processing list).

The detachable device 100 according to the present embodiment stores information on the processing functions it has in address A in the ROM 404. The computation processing unit 203 of the image capturing apparatus 110 can confirm the information on the processing functions of the detachable device 100 by issuing a multi read command or a single read command to this address A. Here, the information on the processing function includes whether the processing function is present (the flag data), the time required to complete the processing if executed (the estimated processing time), the data size of the processing result, and address information where the processing result is stored (information on the storage destination address).

FIG. 14 illustrates an example of the information on the processing function. A processing function presence flag 1401 (the flag data) indicates that the detachable device 100 has the analysis processing function. The image capturing apparatus 110 can determine whether the detachable device 100 has any analysis processing functions by checking the processing function presence flag 1401. Processing function classification 1402 indicates the analysis processing that the detachable device 100 has. Input data size 1403 and processed data number 1404 indicate information about the data input specifications of each processing function. Estimated processing time 1405 indicates the time taken from when data is input to when a processing result is output, and processing result data number 1406 indicates a number of processing result data. Processing result storage destination address 1407 indicates the address in the RAM 405 where the processing result will be stored. The computation processing unit 203 can construct a processing function table, illustrated in FIG. 15, by reading out the data (the information on the processing functions) as shown in FIG. 14 from address A in ROM 404. The processing function table is held in the storage unit 303, for example, so as to be capable of being referenced in the processing in the image capturing apparatus 110.

If a read command for address A is not issued from the computation processing unit 203, the detachable device 100 determines that the device attached thereto is a device that does not use the analysis processing functions. In this case, the detachable device 100 can only execute the storage processing for the ROM 404 with respect to the transferred data. This enables the detachable device 100 to function only as a memory device for devices that do not require analysis processing functions. Although the method described here is a method that stores information on processing functions at address A in the ROM 404, the method is not limited thereto. For example, in a response to a command used during the initial configuration of the detachable device 100, information on the processing functions may be added to the response argument part 1315.

Note that the image capturing apparatus 110, for example, executes the readout from address A in the ROM 404 after initialization settings of the detachable device 100 end. The image capturing apparatus 110 discards the information read out when the device is no longer detected at the socket. If the device is inserted into the socket after the information is discarded, the image capturing apparatus 110 reads out the value of address A again after the initialization settings end. This enables the image capturing apparatus 110 to read out and configure information about the functions of the detachable device 100 when a different detachable device 100 is inserted.

FPGA Control for Execution of Analysis Processing

The execution of the analysis processing in the detachable device 100 according to the present embodiment, which is realized by such command-based communication between the image capturing apparatus 110 and the detachable device 100, will be described in detail with reference to the flowchart in FIG. 16. The flowchart in FIG. 16 illustrates the processing of steps S1105 to S1107 in FIG. 11, including the commands at each stage, and the content thereof from the perspective of the FPGA 402. In other words, the flowchart illustrates an example of the flow of control in the detachable device 100 when the computation processing unit 203 of the image capturing apparatus 110 requests analysis processing from the detachable device 100. It is assumed that the computation processing unit 412 has already been configured to be capable of executing the designated analysis processing prior to the processing in FIG. 16, and that the data of the inference model for the designated analysis processing has also been loaded into the inference model region of the RAM 405.

The FPGA 402 receives an image input command, issued by the computation processing unit 203, that conforms to the SD standard through the LT 401, and stores the accepted image (the resulting image from the pre-analysis processing; referred to as an "input image" hereinafter) in the work region of the RAM 405 (step S1601). The image input command is a write command for writing a number equivalent to the processed data number 1404 configured for each instance of analysis processing. At this time, the SD controller 403 receives the write command through the FPGA 402 and writes the input image to the address of the work region in the RAM 405 specified by the write command.

Next, the FPGA 402 receives an analysis start command, issued by the computation processing unit 203 and conforming to the SD standard (step S1602), The analysis start command is a command to cause the computation processing unit 412 to execute the analysis processing in the current configuration (logic circuit structure).

In response to reception of the analysis start command, the computation processing unit 412 executes the analysis processing for the input image stored in the work region in step S1601, and stores the derived analysis result at the storage destination address in the RAM 405, specified for that analysis processing (step S1603).

The FPGA 402 receives a result output command, issued by the computation processing unit 203, which conforms to the SD standard, and returns the analysis result stored in step S1603 to the computation processing unit 203 (step S1604). The result output command is a read command, specifying the processing result storage destination address 1407 set for each instance of analysis processing, for reading out a number equivalent to the processing result data number 1406 similarly configured. At this time, the SD controller 403 receives a read command through the FPGA 402, reads out the data of the analysis result stored in the address of the RAM 405 specified by the read command, and returns that data to the computation processing unit 203 through the FPGA 402 and the LT 401. This enables the image capturing apparatus 110 to obtain an analysis result pertaining to the designated analysis processing.

FPGA Control Related to Switching Analysis Processing

Incidentally, the control of the execution of the analysis processing in the detachable device 100 illustrated in FIG. 16 is performed when one type of analysis processing is to be executed on the captured image to be processed. As described above, in the image analysis system according to the present embodiment, the GUI 2001 is presented in the input/output apparatus 130, and the execution of a plurality of types of analysis processing can be selected for the captured image.

If the selected plurality of instances of analysis processing are all analysis processing executed in the detachable device 100, and if the FPGA 402 is capable of executing these instances of analysis processing in parallel, a similar analysis result can be obtained through the execution control illustrated in FIG. 16. On the other hand, an FPGA 402 capable of executing a plurality of instances of analysis processing in parallel requires an equivalent level of computing performance, which naturally leads to higher costs. In addition to costs, the detachable device 100 also consumes a greater amount of power, which, especially when the device is attached to a battery-powered apparatus, may reduce the drivable time of the apparatus more than before. Assuming these factors, it is realistic to limit the number of instances of analysis processing that can be executed simultaneously, and if the number of selected instances of analysis processing exceeds this number, it will be necessary for the FPGA 402 to sequentially switch the analysis processing to be executed. In other words, processing in which the computation processing unit 203 of the detachable device 100 further issues a processing switch command and varies the analysis processing executed by the computation processing unit 412 is required in addition to the execution control illustrated in FIG. 16.

However, as mentioned above, the data loaded in the inference model region cannot be rewritten during the period when the preceding analysis processing is being executed, and particularly during the period when inference processing based on the inference model specific to that analysis processing is being performed. Accordingly, in a situation where the operation control of the detachable device 100 by the image capturing apparatus 110 is command-based, it is necessary for the computation processing unit 203 of the image capturing apparatus 110 to control the timing of the issuance of the processing switch command, taking into account the operation state of the FPGA 402. In other words, when executing a plurality of instances of analysis processing sequentially and obtaining analysis results, it has been necessary to issue a processing switch command to change the computation processing unit 412 to a state that enables execution of subsequent analysis processing after the completion of the previous execution control of the FPGA 402, illustrated in FIG. 16, and then perform execution control again in a similar manner. More specifically, the processing switch command is issued after the computation processing unit 203 stands by until the estimated processing time has elapsed following the transmission of the analysis start command related to at least the preceding analysis processing. Based on the reception of the processing switch command, the processing switching unit 411 reads out the information for processing pertaining to the analysis processing to be switched to from the ROM 404 and loads that information into the inference model region of the RAM 405. On top of this, it has been necessary for the computation processing unit 203 to issue further analysis start commands for subsequent processing. Accordingly, while the image capturing apparatus 110 can use advanced analysis processing with the attached detachable device 100, the processing is subject to restrictions imposed by the specifications of the detachable device 100, and depending on the type and number of instances of analysis processing selected, the time required to obtain the desired analysis results may be prolonged.

To avoid prolonging the analysis time in this manner, it is conceivable to have the computation processing unit 203 more accurately identify the completion timing of the inference processing and control the issuance of the processing switch commands. However, from the perspective of implementing functional expansion of the apparatus to which the detachable device 100 is attached, it is not realistic to force the apparatus side to control the issuance in this manner. Accordingly, the image analysis system according to the present embodiment does not require the issuance of processing switch commands to be controlled in the image capturing apparatus 110, but rather controls the operations of the FPGA 402 so as to make the switching of the analysis processing more efficient in the detachable device 100. More specifically, the computation processing unit 203 issues analysis start commands and processing switch commands sequentially according to the order in which the plurality of instances of analysis processing are executed, without considering the timing of issuance, and the FPGA 402 that receives the commands controls the operations according to the state of execution of the analysis processing. In other words, the computation processing unit 203 need not dynamically control the timing of issuing processing switch commands according to the combination of the plurality of instances of analysis processing to be switched and executed, and it is sufficient to simply issue the processing switch commands according to the order of execution.

FIG. 17 illustrates an example of the flow of control in the detachable device 100 according to the present embodiment when a processing switch command is received from the computation processing unit 203.

The FPGA 402 receives a processing switch command conforming to the SD standard from the computation processing unit 203 (step S1701). The received processing switch command is transmitted from the input/output control unit 410 to the processing switching unit 411. The processing switching unit 411 determines whether the computation processing unit 412 is executing the preceding analysis processing (step S1702). The present embodiment describes switching the analysis processing by changing the inference model, and thus this determination may be made based on whether or not the inference processing using the inference model currently loaded in the inference model region is being executed for the analysis processing being executed by the computation processing unit 412.

If the computation processing unit 412 is not executing the preceding analysis processing (NO in step S1702), the processing switching unit 411 reads out the information for processing pertaining to the analysis processing to be switched to from the ROM 404 and loads the data of the corresponding inference model into the inference model region in the RAM 405 (step S1706), As a result, the computation processing unit 412 switches to a state of being capable of executing the analysis processing which has been switched to.

On the other hand, if the computation processing unit 412 is executing the preceding analysis processing (YES in step S1702), the data of the inference model in the inference model region cannot be changed. Accordingly, the processing switching unit 411 reads out the information for processing pertaining to the analysis processing to be switched to from the ROM 404 and loads the data of the corresponding inference model into the preliminary region of the RAM 405 (step S1703). The processing switching unit 411 stands by until the computation processing unit 412 completes the preceding analysis processing (step S1704), and after the completion, moves or copies the data of the inference model loaded in the preliminary region to the inference model region (step S1705). As a result, the computation processing unit 412 similarly switches to a state of being capable of executing the analysis processing which has been switched to.

Here, the loading of the data of the inference model related to the analysis processing to be switched to into the preliminary region of the RAM 405 depends on the time required to move (or copy) the data in the RAM 405 being shorter than the time required to read out the information from the ROM 404 and load that data into the RAM 405. In other words, in the detachable device 100 according to the present embodiment, instead of executing all processing related to the processing switch command after the completion of the preceding analysis processing in the computation processing unit 412, the processing of reading out from the ROM 404, which takes relatively long time, is executed in advance using the preliminary region. This reduces the time required for switching the processing compared to a situation in which the computation processing unit 203 of the image capturing apparatus 110 stands by for the time required to complete the preceding analysis processing before issuing a processing switch command.

Figure 18:
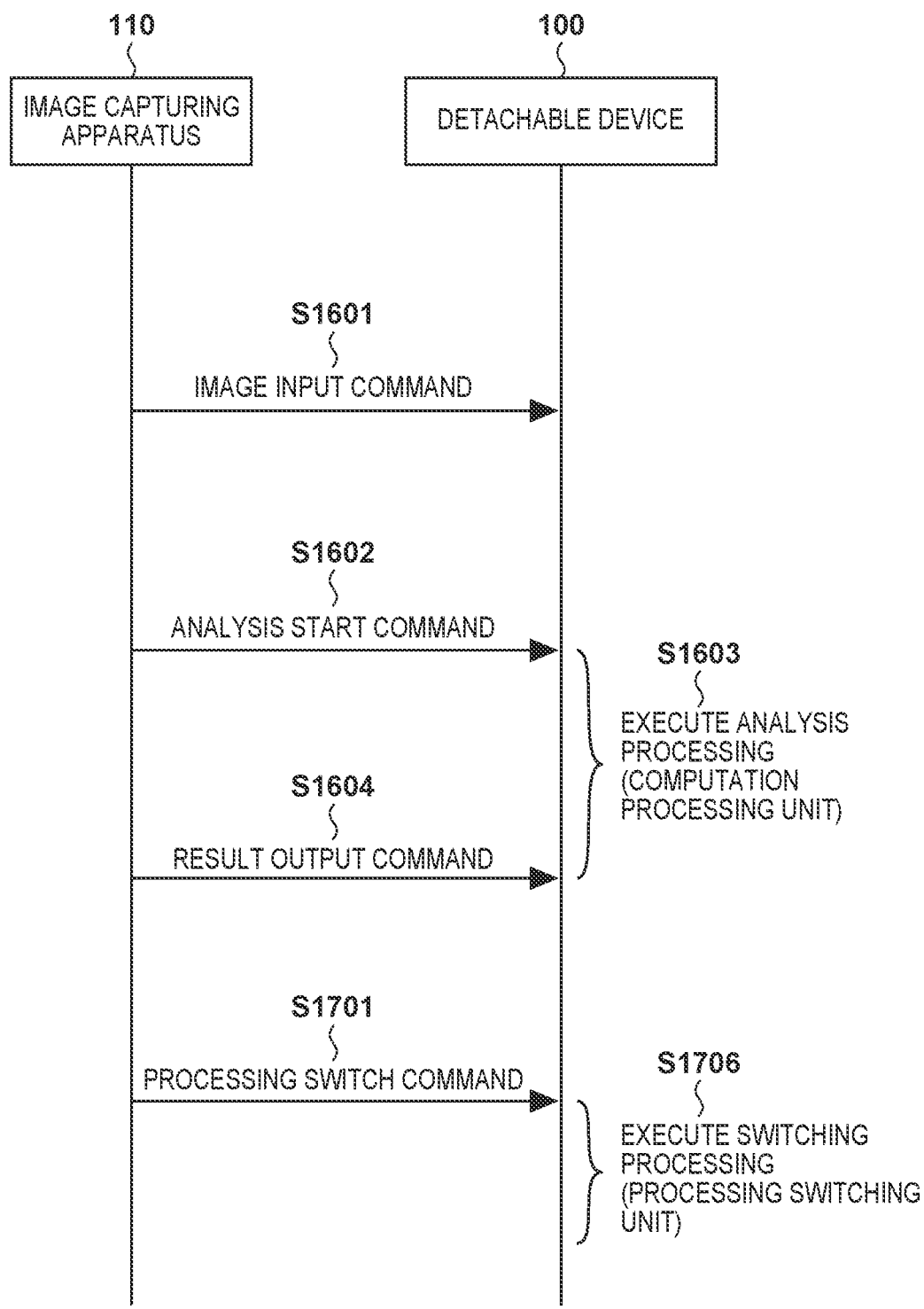
FIG. 18 is a sequence chart for a case where analysis processing is not being executed when a processing switch command is received according to the embodiments and variation of the present invention.
Figure 19:
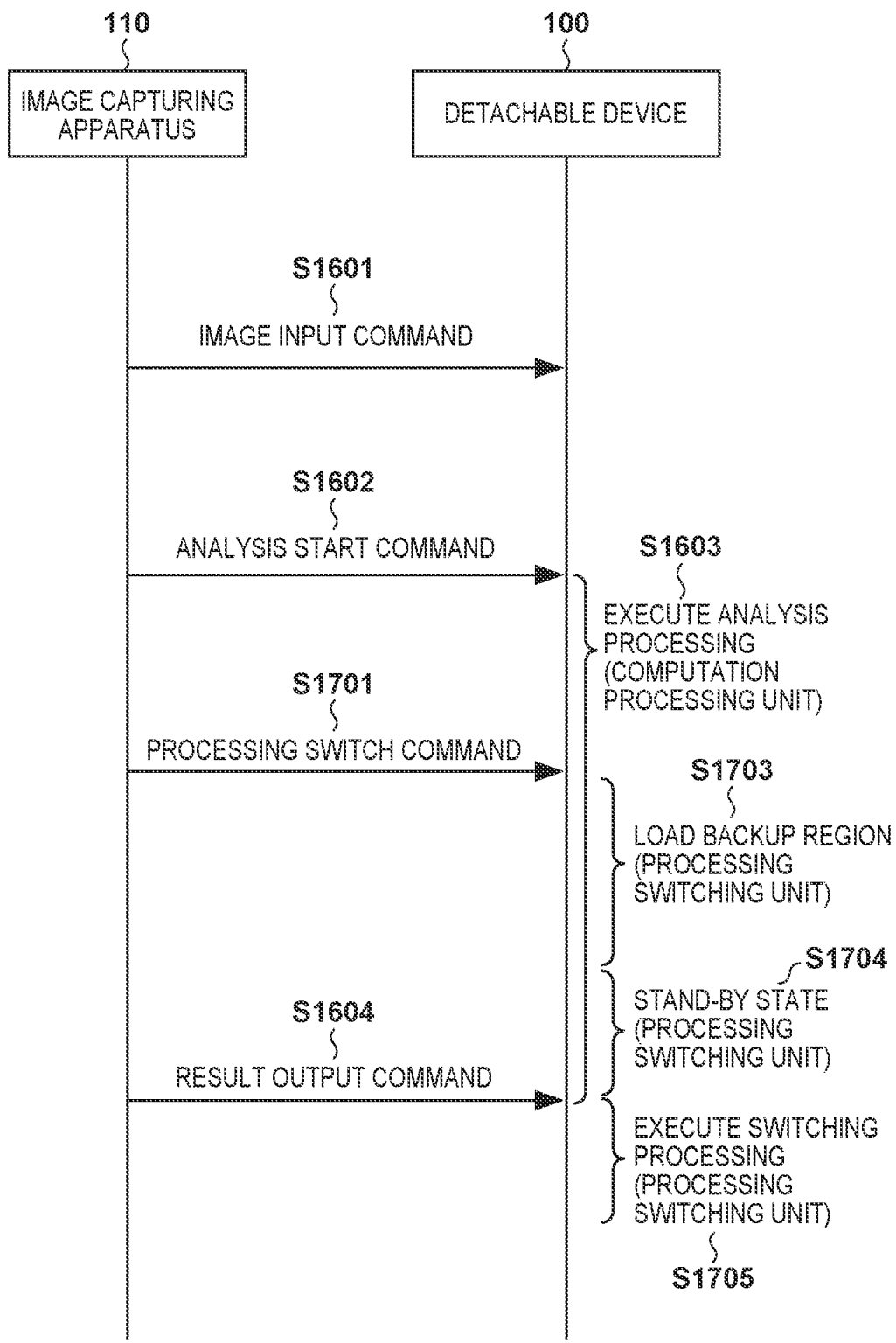
FIG. 19 is a sequence chart for a case where analysis processing is being executed when a processing switch command is received according to the embodiments and variation of the present invention.

Represented as a sequence chart, the processing illustrated in FIG. 17 is as illustrated in FIGS. 18 and 19.

FIG. 18 illustrates a sequence for a case where the computation processing unit 412 is not executing analysis processing (NO in step S1702) when a processing switch command is received in the detachable device 100 (step S1701). As illustrated here, after the processing switch command is received, the information for processing is read out from the ROM 404 and loaded into the inference model region of the RAM 405, and the analysis processing is switched (step S1706). This is therefore similar to a situation in which the computation processing unit 203 of the image capturing apparatus 110 stands by until the preceding analysis processing (step S1603) is complete before issuing a processing switch command.

On the other hand, FIG. 19 illustrates a sequence for a case where the computation processing unit 412 is executing analysis processing (YES in step S1702) when a processing switch command is received in the detachable device 100 (step S1701). As illustrated here, after the processing switch command is received, the information for processing is read out from the ROM 404 and loaded into the preliminary region of the RAM 405 (step S1703) without waiting for the analysis processing being executed to be complete (step S1603). The system then stands by until the analysis processing being executed is completed (step S1704), and then the analysis processing is switched by moving (or copying) the data from the preliminary region to the inference model region (step S1705). If the preceding analysis processing is completed before the loading into the preliminary region is completed, the detachable device 100 may perform processing so as not to accept an analysis start command for subsequent analysis processing.

In this manner, according to the computing apparatus of the present embodiment, when executing a plurality of types of processing while switching therebetween, the switching of the processing can be made more efficient without requiring the apparatus on the side transmitting the switching instruction to execute special processing, which makes it possible to reduce the time required to execute the plurality of types of processing. More specifically, the computing apparatus can receive switching instructions even while the preceding processing is being executed, and if the preceding process is being executed at the time of the reception, some processing necessary for switching the processing can be executed in advance, which makes it possible to reduce the standby time required from the completion of the preceding processing to the execution of the subsequent processing.

Although the present embodiment describes a situation where, as illustrated in FIG. 17, one processing switch command is received during the execution of the preceding analysis processing, the implementation of the present invention is not limited thereto. For example, a plurality of instances of analysis processing to be executed by the detachable device 100 may have the processing order determined in the image capturing apparatus 110, and at least one processing switch command may be received by the detachable device 100 prior to the execution of the analysis processing. In this case, the processing switching unit 411 may manage the usage state of the preliminary region, and if there seems to be extra space after the information is loaded into the preliminary region for one processing switch command, may control the loading of information for further subsequent analysis processing into the preliminary region. In other words, the manner in which the information is loaded into the preliminary region may be controlled differently depending on the usage state of the preliminary region. Although be present embodiment describes each region of the RAM 405 (the inference model region, the work region, and the preliminary region) as being reserved and static, the required size of the inference model region and the work region varies depending on the analysis processing to be executed. Accordingly, some of the unused and extra inference model region and work region may be temporarily allocated as preliminary regions in order to further improve the efficiency of the loading of data for switching the processing.

Second Embodiment

Incidentally, the foregoing embodiment described a situation in which designated analysis processing is executed sequentially on the captured image. In other words, a situation was described in which even if the captured image is divided in the pre-analysis processing, one instance of analysis processing is executed on all divided images and an (integrated) analysis result is output, after which the next analysis processing is executed.

Figure 22:
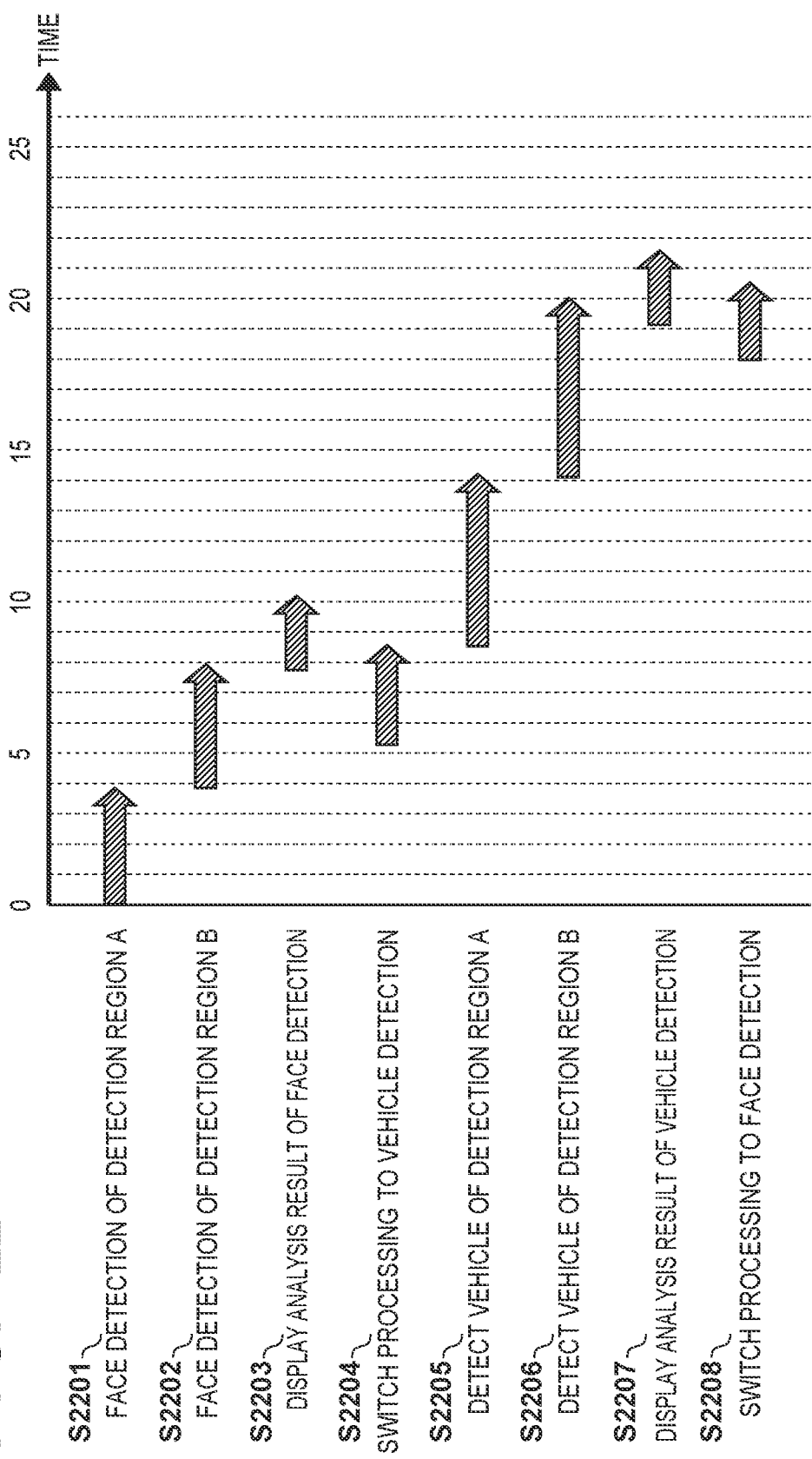
FIG. 22 is a time chart illustrating an example of the flow of processing in a detection processing priority mode according to the second embodiment of the present invention.

For example, in a situation where each of sequentially-input captured images is divided into divided images (detection regions) A and B, two types of analysis processing, namely face detection processing and vehicle detection processing, are executed, and the analysis results are displayed as post-processing, the situation is as illustrated by the time chart in FIG. 22. In the example illustrated here, the analysis processing is executed in the order of face detection processing vehicle detection processing, and the divided images are input to the detachable device 100 and processed in the order of detection regions A B for each instance of analysis processing.

Specifically, in a state where the FPGA 402 is configured for face detection processing, the image in detection region A is first input and the face detection processing is executed (step S2201), after which the image in detection region B is input and the face detection processing is executed (step S2202). The analysis results of each instance of face detection processing are read out to the image capturing apparatus 110 after the completion of each instance of processing, integrated, transmitted to the input/output apparatus 130, for example, and then displayed (step S2203). The processing switch command for switching to the subsequent vehicle detection processing is issued at any timing after the issuance of the analysis start command for the face detection processing involved in step S2202, and after part of the processing pertaining to the switching is started in advance, the switch is completed after the completion of the face detection processing in step S2202 (step S2204).

Thereafter, in other words, with the FPGA 402 configured for the vehicle detection processing, the image of detection region A is input again and the vehicle detection processing is executed (step S2205), after which the image of detection region B is input and the vehicle detection processing is executed (step S2206), The analysis results of each instance of vehicle detection processing are read out to the image capturing apparatus 110 after the completion of each instance of processing, integrated, transmitted to the input/output apparatus 130, and then displayed (step S2207). In order to switch the processing for the next captured image to be processed, a processing switch command for switching the processing to face detection processing is issued at any timing after the analysis start command for the vehicle detection processing pertaining to step S2206 is issued, and part of the processing related to the processing switch is started in advance. Then, after the vehicle detection processing in step S2206 is complete, the switch of the FPGA 402 to the configuration for the face detection processing is completed (step S2208).

When inputting images for each detection region, cropping the image of the corresponding region from the captured image and resizing the image according to the processing may be executed as the pre-analysis processing, and the obtained resulting image may be transmitted to the detachable device 100 along with the image input command. Alternatively, the captured image may be temporarily transmitted to the detachable device 100, and the computation processing unit 412 may execute each instance of analysis processing while reading out the corresponding detection region.

Here, although FIG. 22 illustrates an example where the analysis results are displayed after the completion of each instance of analysis processing, in some cases it is preferable to display the analysis results from the plurality of instances of analysis processing that have been executed together. In other words, in the example illustrated in FIG. 22, it is necessary to stand by until the timing of step S2207 to be able to display the analysis results from both the face detection processing and the vehicle detection processing, which is not suitable for cases where it is necessary to display a plurality of types of analysis results immediately. For example, in a surveillance system or the like, regions and the like in the captured image may be set for detection preferentially, and it is therefore necessary to shorten the time required to obtain analysis results when a plurality of instances of analysis processing are executed.

Figure 21:
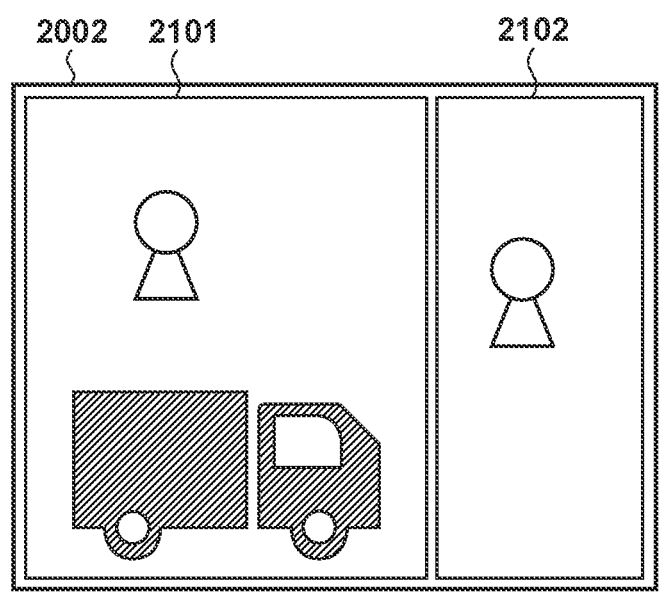
FIG. 21 is a diagram illustrating an example of a user interface presented in a detection region priority mode according to a second embodiment of the present invention.

Accordingly, as illustrated in FIG. 21, the image analysis system according to the present embodiment is configured to be capable of accepting a setting for the region of the captured image for which the execution of analysis processing is prioritized. The region pertaining to the captured image may be made capable of being set based on an operation input to the captured image display region 2002 of the GUI 2001 displayed in the input/output apparatus 130, illustrated in FIG. 20. FIG. 21 illustrates an example of the display in the captured image display region 2002 when settings of a region 2101 and a region 2102 are accepted for the captured image, and a frame that may be of any shape is added. The following assumes that priority is set for the execution of a plurality of instances of analysis processing for the region 2101 of these regions, and thus this region will be referred to below as a "priority region 2101", while the other region will be referred to as an "other region 2102".

Figure 23:
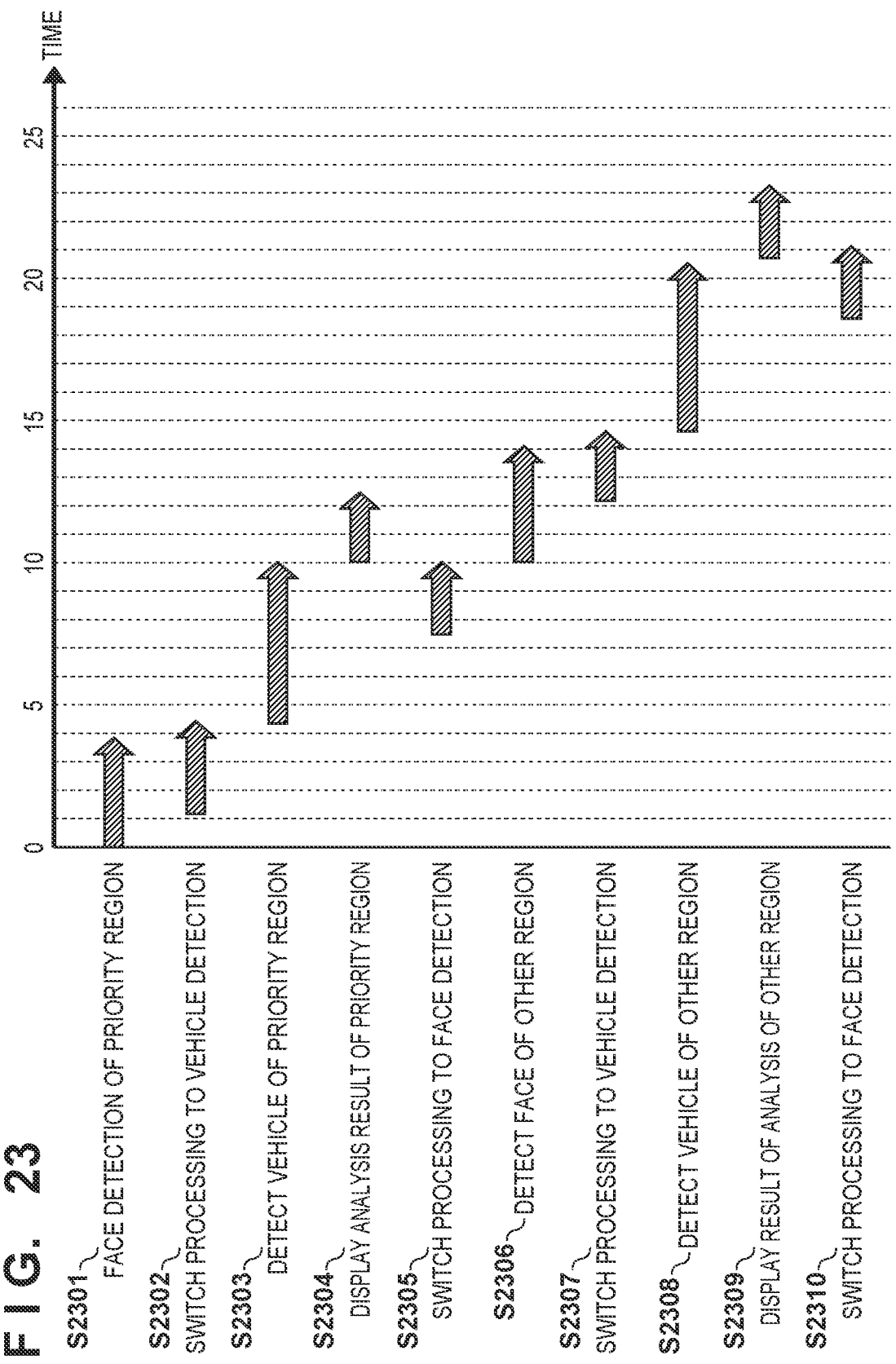
FIG. 23 is a time chart illustrating an example of the flow of processing in the detection region priority mode according to the second embodiment of the present invention.
Figure 24:
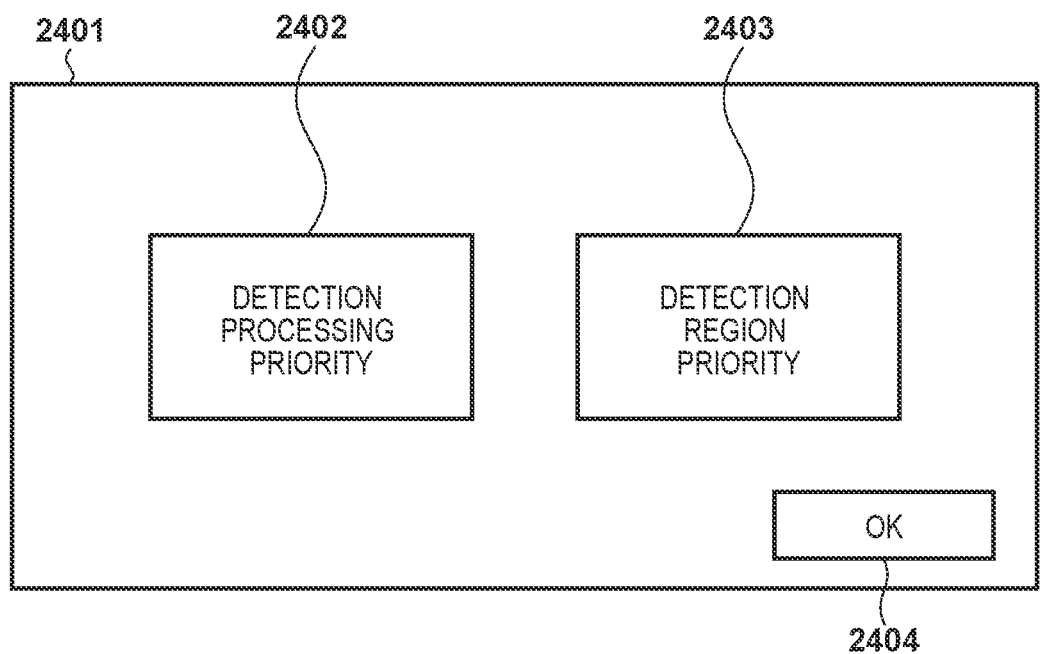
FIG. 24 is a diagram illustrating an example of a user interface for switching modes according to the second embodiment of the present invention.

Note that whether to set a region of priority for the execution of the analysis processing may be determined based on an operation input received via a mode selection GUI 2401 illustrated in FIG. 24, which may be transition-able to from the GUI 2001, for example. The GUI 2401 includes a button 2402 for selecting "detection processing priority" mode, a button 2403 for selecting "detection region priority" mode, and a button 2404 for confirming the result of the mode selection. The detection processing priority mode pertaining to the button 2402 is a mode in which results are sequentially displayed at the timing at which the analysis results for the entire captured image are obtained for each instance of analysis processing, as illustrated in the example in FIG. 22. The detection region priority mode pertaining to the button 2403 is a mode in which the priority region 2101 is set and the results are displayed at the timing at which all analysis results from the designated analysis processing for at least the priority region 2101 are obtained, as illustrated in FIG. 23, described below. Accordingly, when an operation input pertaining to the selection of the button 2403 is made in the GUI 2401 and the mode is confirmed through an operation input made using the button 2404, the GUI 2001 may be controlled to enable a region to be set, including the priority region 2101.

Information on the mode selection and information on each region in the detection region priority mode are transmitted from the input/output apparatus 130 to the image capturing apparatus 110, and are used at least for the pre-analysis processing by the analysis unit 305 and controlling the issuance of commands by the computation processing unit 203 and the order thereof. As described above, in the detection region priority mode, the computation processing unit 203 determines the commands to be issued according to the following issuing criteria (order) in order to prioritize the obtainment of a plurality of analysis results for the priority region and the display (post-processing) of the results.

(1-1) Input image of priority region
(1-2) Sequentially execute designated analysis processing for priority region
(1-3) When there are a plurality of instances of designated analysis processing, load the inference model in the preliminary region during the execution of the preceding analysis processing
(1-4) Obtain all analysis results pertaining to the priority region after the completion of all instances of designated analysis processing
(2-1) Input image of the other region
(2-2) Sequentially execute designated analysis processing for other region
(2-3) When there are a plurality of instances of designated analysis processing, load the inference model in the preliminary region during the execution of the preceding analysis processing
(2-4) Obtain all analysis results pertaining to the other region after the completion of all instances of designated analysis processing Here, in the combination of the numbers in parentheses (M-N), M indicates a priority level of the region (where a lower value indicates a higher priority level, and a maximum value corresponds to a number of region divisions) and N indicates a priority level for command issuance (where a lower value indicates earlier in the issuance order), and the command issued by the computation processing unit 203 is determined based thereon. When the priority region 2101 and the other region 2102 illustrated in FIG. 21 are set, the computation processing unit 203 determines to issue commands in the following order: (1-1)→(1-2)→(1-3)→(1-4)→(2-1)→(2-2)→(2-3)→(2-4). Here, in the example illustrated in FIG. 21, M is assigned "1" for the priority region 2101 and "2" for the other region 2102.

Accordingly, in a situation where each of sequentially-input captured images is divided into the priority region 2101 and the other region 2102, two types of analysis processing, namely face detection processing and vehicle detection processing, are executed, and all the analysis results are integrated and displayed on a region-by-region basis as post-processing, the situation is as illustrated by the time chart in FIG. 23. In the example illustrated here, divided images are input to the detachable device 100 in the order of the priority region 2101 the other region 2102, and analysis processing is executed for each divided image in the order of face detection processing→vehicle detection processing.

Specifically, in a state where the FPGA 402 is configured for face detection processing, the image of the priority region 2101 is input first, and the face detection processing is executed (step S2301), The processing switch command for switching to the subsequent vehicle detection processing is issued at any timing after the issuance of the analysis start command for the face detection processing involved in step S2301, and after part of the processing pertaining to the switching is started in advance, the switch is completed after the completion of the face detection processing (step S2302). Next, the vehicle detection processing is executed on the image of the priority region 2101 (step S2303), The analysis results of both instances of analysis processing are then read out to the image capturing apparatus 110, integrated, and transmitted, to, for example, the input/output apparatus 130, and then displayed (step S2304). In order to switch the processing for the image of the other region 2102, which is to be analyzed next, a processing switch command for switching the processing to face detection processing is issued at any timing after the analysis start command for the vehicle detection processing pertaining to step S2303 is issued, and part of the processing related to the processing switch is started in advance. Then, after the vehicle detection processing in step S2304 is complete, the switch of the FPGA 402 to the configuration for the face detection processing is completed (step S2305).

Thereafter, in other words, in a state where the FPGA 402 is configured for the face detection processing again, the image of the other region 2102 is input, and the face detection processing is executed (step S2306). The processing switch command for switching to the subsequent vehicle detection processing is issued at any timing after the issuance of the analysis start command for the face detection processing involved in step S2306, and after part of the processing pertaining to the switching is started in advance, the switch is completed after the completion of the face detection processing (step S2307). Next, the vehicle detection processing is executed on the image of the other region 2102 (step S2308). The analysis results of both instances of analysis processing are then read out to the image capturing apparatus 110, integrated, and transmitted to, for example, the input/output apparatus 130, and then displayed (step S2309). In order to switch the processing for the next captured image to be processed, a processing switch command for switching the processing to face detection processing is issued at any timing after the analysis start command for the vehicle detection processing pertaining to step S2309 is issued, and part of the processing related to the processing switch is started in advance. Then, after the vehicle detection processing in step S2309 is complete, the switch of the FPGA 402 to the configuration for the face detection processing is completed (step S2310).

In this manner, a plurality of types of analysis results can be presented for at least the priority region 2101, even if all instances of the designated analysis processing for the entire captured image are not complete, as in the detection processing priority mode. In the detection region priority mode, the same image can be the target of analysis processing executed continuously by the detachable device 100 for one region, which makes it possible to reduce the number of times image input commands are issued compared to the detection processing priority mode. In other words, after issuing an image input command for an image of a region to be processed, the computation processing unit 203 performs control so as not to issue image input commands for images of other regions until the analysis start command and processing switch command pertaining to the plurality of instances of designated analysis processing for the image are issued. This makes it possible to reduce the time for issuing image input commands when executing each instance of analysis processing, compared to the detection processing priority mode.

Variations

Although the foregoing embodiments described a situation in which the analysis processing executed by the computation processing unit 412 is changed by moving or copying the data of the inference model loaded in the preliminary region to the inference model region, the implementation of the present invention is not limited thereto. For example, the change in the processing executed by the computation processing unit 412 may be made by reconfiguring the logical operation structure of the computation processing unit 412, and the data that has been started being loaded into the preliminary region during the execution of the preceding analysis processing may be configuration data pertaining to the processing to be switched to. In this case, after the preceding analysis processing is completed, the processing switching unit 411 may move or copy the configuration data loaded in the preliminary region to a region for reconfiguration in the computation processing unit 412 and reconfigure that data.

Although the foregoing embodiments described image analysis processing as an example of the analysis processing, the present invention can also be applied to audio analysis processing. For example, the present invention can also be applied to processing for detecting audio patterns such as screams, gunshots, the sound of glass breaking, and the like. For example, audio features are extracted using various audio data analysis methods, such as spectral analysis, and the extracted features are compared with the detected audio pattern. A degree of agreement thereof can then be calculated to detect a specific audio pattern.

When performing audio analysis processing, the audio data is divided into audio data of a predetermined amount of time, and the audio analysis processing is performed using the audio data of that predetermined amount of time as a unit. This predetermined time varies as appropriate according to the audio pattern to be detected. Accordingly, audio data is input to the detachable device 100 for each amount of time corresponding to the audio pattern to be detected. The detachable device 100 has a function for analyzing the input audio data and holding the input audio data.

Additionally, the foregoing embodiments described the detachable device 100 that can non-temporarily store data input from the image capturing apparatus 110 as an example of the computing apparatus. In some embodiments, however, the detachable device 100 may be a device that cannot non-temporarily store data input from the image capturing apparatus 110. In other words, the detachable device 100 may only perform analysis processing on data input from the image capturing apparatus 110, and may not have a function for non-temporarily storing that data. In other words, the detachable device 100 may be an apparatus that is not intended to be used for storing data like a regular SD card, but has a function only for analysis processing.

Other Embodiments

Embodiment(s) of the present invention can also be realized by a computer of a system or apparatus that reads out and executes computer executable instructions (e.g., one or more programs) recorded on a storage medium (which may also be referred to more fully as a non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (I AVM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-135029, filed Aug. 20, 2021, which is hereby incorporated by reference herein in its entirety.

What is claimed is:

1. A computing apparatus capable of executing a plurality of types of processing, the computing apparatus comprising:
at least one processor and/or circuitry configured to execute at least one of the plurality of types of processing;
a temporary memory; and
a permanent memory configured to store necessary information for executing each of the plurality of types of processing and instructions that, when executed by the at least one processor and/or circuitry, cause the at least one processor and/or circuitry to function as:
a receiving unit configured to receive a switching instruction for switching processing; and
a switching unit configured to switch processing executed by the at least one processor and/or circuitry by varying the necessary information in response to reception of the switching instruction, the necessary information being read out from the permanent memory and loaded into a first region of the temporary memory,
wherein if the at least one processor and/or circuitry is executing at least one of the plurality of types of processing when the switching instruction is made, the switching unit switches the at least one processor and/or circuitry to a state of being capable of executing processing to be switched to by reading out, from the permanent memory, the necessary information related to the processing to be switched to, loading the necessary information into a second region of the temporary memory different from the first region, and moving or copying the necessary information related to the processing to be switched to from the second region to the first region in response to the processing being executed ending,
the necessary information includes information for changing content of at least some computation processing in the processing executed by the at least one processor and/or circuitry, the at least some computation processing including inference processing using an inference model, and
in a case where executing at least one of the plurality of types of processing, the at least one processor and/or circuitry executes the at least some computation processing using the necessary information loaded into the first region.

2. The computing apparatus according to claim 1, wherein
the necessary information includes information that constitutes the inference model when loaded into the first region.

3. The computing apparatus according to claim 2, wherein if the inference processing using the inference model loaded into the first region is being executed when the switching instruction is made, the switching unit loads information that constitutes the inference model used in the processing to be switched to into the second region.

4. The computing apparatus according to claim 1,
wherein the computing apparatus is a reconfigurable computing apparatus,
the necessary information is information for reconfiguring a logical operation structure of the at least one processor and/or circuitry, and
the switching unit causes the at least one processor and/or circuitry to be reconfigured based on the necessary information related to the processing to be switched to being moved or copied from the second region to the first region in response to the processing being executed ending.

5. The computing apparatus according to claim 1,
wherein the permanent memory further stores instructions that, when executed by the at least one processor and/or circuitry, cause the at least one processor and/or circuitry to function as a management unit configured to manage a usage state of the second region,
wherein the receiving unit receives at least one switching instruction related to processing executed sequentially, the at least one switching instruction being the switching instruction, and
if the at least one processor and/or circuitry is executing at least one of the plurality of types of processing when the at least one switching instruction is received, the switching unit varies a loading form, in which the necessary information is loaded into the second region, of the necessary information corresponding to the at least one switching instruction, according to the usage state of the second region.

6. The computing apparatus according to claim 1,
wherein each of the plurality of types of processing is analysis processing on an input image, and
wherein the permanent memory further stores instructions that, when executed by the at least one processor and/or circuitry, cause the at least one processor and/or circuitry to function as a first obtainment unit configured to obtain the input image and store the input image in a third region of the temporary memory.

7. An image capturing apparatus to which the computing apparatus according to claim 6 is detachably connected, the image capturing apparatus comprising:
an image capturing unit configured to output a captured image;
at least one processor and/or circuitry; and
a memory storing instructions that, when executed by the at least one processor and/or circuitry, cause the at least one processor and/or circuitry to function as:
a determination unit configured to determine a plurality of instances of analysis processing to be executed on the captured image by the computing apparatus and an order of the plurality of instances of analysis processing;
a first input unit configured to input the captured image to the computing apparatus as the input image;
a second input unit configured to sequentially input execution instructions for the plurality of instances of analysis processing and the switching instruction to the computing apparatus based on the order determined by the determination unit; and
a second obtainment unit configured to obtain an analysis result of the plurality of instances of analysis processing by the computing apparatus.

8. The image capturing apparatus according to claim 7,
wherein the permanent memory further stores instructions that, when executed by the at least one processor and/or circuitry, cause the at least one processor and/or circuitry to function as a dividing unit configured to divide the captured image into a plurality of regions,
the first input unit inputs the input image in a form of divided images obtained by the dividing performed by the dividing unit,
the second input unit further inputs, to the computing apparatus, a write instruction to write into the third region of the temporary memory of the computing apparatus when the divided images are input by the first input unit, and
when obtaining an analysis result of the plurality of instances of analysis processing is prioritized for a predetermined one of the divided images, the determination unit determines the order such that the write instruction for inputting another of the divided images is not included until after the execution instructions for the plurality of instances of analysis processing and the switching instruction, related to the predetermined one of the divided images, are complete following the write instruction for inputting the predetermined one of the divided images.

9. The image capturing apparatus according to claim 7,
wherein the computing apparatus is a recording apparatus of the SD standard, and
the first input unit, the second input unit, and the second obtainment unit are compliant with a communication standard of the SD standard.

10. A control method for a computing apparatus capable of executing a plurality of types of processing,
wherein the computing apparatus comprises:
a at least one processor and/or circuitry configured to execute at least one of the plurality of types of processing;
a temporary memory; and
a permanent memory configured to store necessary information for executing each of the plurality of types of processing, and
the control method comprises:
receiving a switching instruction for switching processing; and
switching processing executed by the at least one processor and/or circuitry by varying the necessary information in response to reception of the switching instruction, the necessary information being read out from the permanent memory and loaded into a first region of the temporary memory, and
in the switching, if the at least one processor and/or circuitry is executing at least one of the plurality of types of processing when the switching instruction is made, the at least one processor and/or circuitry is switched to a state of being capable of executing processing to be switched to by reading out, from the permanent memory, the necessary information related to the processing to be switched to, loading the necessary information into a second region of the temporary memory different from the first region, and moving or copying the necessary information related to the processing to be switched to from the second region to the first region in response to the processing being executed ending,
the necessary information includes information for changing content of at least some computation processing in the processing executed by the at least one processor and/or circuitry, the at least some computation processing including inference processing using an inference model, and in a case where executing at least one of the plurality of types of processing, the at least one processor and/or circuitry executes the at least some computation processing using the necessary information loaded into the first region.

11. A non-transitory computer-readable storage medium in which is stored a program that causes a computer to execute the control method according to claim 10.

* * * * *